United States Patent
Naguib

(10) Patent No.: US 8,724,749 B2
(45) Date of Patent: *May 13, 2014

(54) CDMA WIRELESS SYSTEMS

(75) Inventor: Ayman F. Naguib, Cupertino, CA (US)

(73) Assignee: Intel Mobil Communications GmbH, Neubiberg (DE)

( * ) Notice: Subject to any disclaimer, the term of this patent is extended or adjusted under 35 U.S.C. 154(b) by 635 days.

This patent is subject to a terminal disclaimer.

(21) Appl. No.: 12/605,837

(22) Filed: Oct. 26, 2009

(65) Prior Publication Data

US 2010/0142591 A1 Jun. 10, 2010

Related U.S. Application Data

(63) Continuation of application No. 11/836,521, filed on Aug. 9, 2007, now Pat. No. 7,623,564, which is a continuation of application No. 10/243,173, filed on Sep. 12, 2002, now Pat. No. 7,466,743.

(60) Provisional application No. 60/322,869, filed on Sep. 12, 2001.

(51) Int. Cl.
*H03D 1/04* (2006.01)
(52) U.S. Cl.
USPC .............................................. 375/346
(58) Field of Classification Search
USPC ......... 375/130, 132, 134, 135, 136, 137, 140, 375/141, 142, 143, 146, 147, 150, 152, 295, 375/316, 259, 260, 267, 299, 346, 347; 455/91, 101, 102, 39, 61, 73, 130, 103; 370/342, 310, 431, 441, 203, 204, 208, 370/209, 328, 329, 331, 332, 334, 335
See application file for complete search history.

(56) References Cited

U.S. PATENT DOCUMENTS 5,659,572 A 8/1997 Schilling
6,012,161 A 1/2000 Ariyavisitakul et al.
(Continued)

FOREIGN PATENT DOCUMENTS

EP 996234 A1 4/2000
EP 1117197 A2 7/2001
(Continued)

OTHER PUBLICATIONS

Abe et al., "A Space-Time Turbo Equalizer in Frequency Selective MIMO Channels", The Institute of Electronics, Information and Communication Engineers, pp. 75-80 (Mar. 2001).
(Continued)

*Primary Examiner* — Sam K Ahn
*Assistant Examiner* — Vineeta Panwalkar
(74) *Attorney, Agent, or Firm* — Schiff Hardin LLP

(57) ABSTRACT

Information symbols are transmitted simultaneously on independent streams using the same spreading code but from different transmit antennas at the transmitter. These simultaneous data stream could be intended for the same user (and thereby the data rate for any particular user can be increased) or for different users (thereby increasing the system capacity). Each stream of data can belong to a different signal constellation and use a different channel code. At the receiver, a number of receive antennas equal to at least the number of multiple data streams is used to separate the different data streams. We consider two different cases. The first one when no transmit diversity is used (this case can also include the case when transmit diversity with simple antenna weighting is used) and the second when transmit diversity with space-time block coding is used.

20 Claims, 16 Drawing Sheets

(56) References Cited

U.S. PATENT DOCUMENTS

| | | | |
|---|---|---|---|
| 6,058,105 A | 5/2000 | Hochwald et al. | |
| 6,072,787 A | 6/2000 | Hamalainen et al. | |
| 6,178,196 B1 | 1/2001 | Naguib et al. | |
| 6,192,067 B1 * | 2/2001 | Toda et al. | 375/144 |
| 6,317,411 B1 * | 11/2001 | Whinnett et al. | 370/204 |
| 6,442,218 B1 | 8/2002 | Nakamura et al. | |
| 6,594,473 B1 | 7/2003 | Dabak et al. | |
| 6,721,300 B1 * | 4/2004 | Akiba et al. | 370/342 |
| 6,879,576 B1 | 4/2005 | Agrawal et al. | |
| 6,891,897 B1 | 5/2005 | Bevan et al. | |
| 6,898,248 B1 * | 5/2005 | Elgamal et al. | 375/259 |
| 7,050,419 B2 | 5/2006 | Azenkot et al. | |
| 7,181,167 B2 | 2/2007 | Onggosanusi et al. | |
| 7,215,718 B1 * | 5/2007 | Calderbank et al. | 375/299 |
| 2002/0044591 A1 | 4/2002 | Lee et al. | |
| 2002/0089953 A1 | 7/2002 | Kim et al. | |
| 2002/0118727 A1 | 8/2002 | Kim et al. | |
| 2002/0118770 A1 | 8/2002 | Foschini et al. | |
| 2002/0172293 A1 | 11/2002 | Kuchi et al. | |
| 2002/0196842 A1 | 12/2002 | Onggosanusi et al. | |
| 2003/0002450 A1 | 1/2003 | Jalali et al. | |
| 2003/0026349 A1 | 2/2003 | Onggosanusi et al. | |

FOREIGN PATENT DOCUMENTS

| | | | |
|---|---|---|---|
| EP | 1117197 A3 | 7/2001 | |
| EP | 1117197 B1 | 7/2001 | |
| JP | 11-168453 A | 6/1999 | |
| JP | 2003-534705 | 11/2003 | |
| JP | 2004-507928 | 3/2004 | |
| WO | WO-99/14871 A1 | 3/1999 | |
| WO | WO-99/18682 A2 | 4/1999 | |
| WO | WO-00/14921 | 3/2000 | |
| WO | WO-00/14921 A1 | 3/2000 | |
| WO | WO-00/51265 A1 | 8/2000 | |
| WO | WO-03/023996 A1 | 3/2003 | |

OTHER PUBLICATIONS

European Search Report issued for corresponding application EP 12 17 9106, date of report Sep. 21, 2012.

* cited by examiner

Per-finger Processing

Joint Processing

Per-finger Processing

Joint Processing

Per-finger Processing

Joint Processing

CDMA WIRELESS SYSTEMS

This application claims priority to the provisional patent application entitled "Time-Space Decoding", Ser. No. 60/322,869, filed Sep. 12, 2001.

TECHNICAL FIELD

The present claimed invention relates to the field of communications. In particular, the present claimed invention relate to apparatus and methods for space-time processing and interference suppression techniques that will lead to an increased data rate and or capacity in CDMA based wireless communication systems.

BACKGROUND OF INVENTION

Wireless communication systems are ubiquitous for personal and commercial uses.

Demand continue to increase due to increase in quantity of users and increase in quantity of data desired (e.g., graphics, video, data, etc.). However there is a limit to the number of signals a communication system can accommodate per the number of orthogonal or quasi-orthogonal codes, for a direct sequence spread spectrum application. This is because the communication system is an interference limited and/or a code limited resource.

The need arises to accommodate the increase in the quantity of users and quantity of data desired by the users with the limited resources of the communication system.

One method of accommodating higher data rates is to use wideband transmissions, e.g., three data streams, that are combined at the receiver to produce the resultant signal. However, given the limitation in numbers of code sequences, a wideband system will simply consume the limited number of code resources faster.

Consequently, a need arises to provide wideband transmission without the limitation of consuming code resources.

In a DSSS communication system, multiple signals with different encoding sequences are transmitted simultaneously. To retrieve the desired data stream from the overall data signal, the specific code sequence used to encode the desired signal is reproduced at a receiver, and via the autocorrelation properties, used to detect the original data stream from the noise of and interference in the overall signal. However, in a system such as this, the multiple signals must be sufficiently weak to appear as noise when compared to the signal detected after correlating with the specific code sequence.

Alternative paths exist between a transmitter and receiver due, e.g., to different reflections from objects such as buildings, mountains, trees, cars, etc. that provide duplicate signals at the receiver with unique time delays. These alternative paths or multipaths can be demodulated at the unique time delays and added up to improve the signal-to-noise ratio (SNR). However, in some cases, many or all of the multipaths provide very weak signals due to interference from other transmitters.

Consequently a need arises to overcome the limitation of signal reception due to interference of other transmitters.

One method used to overcome this limitations is to use multiple antennas on a transmitter alone or to use multiple antennas on a transmitter and receiver. This provides additional multipaths for the signal that might overcome some of the geographical barriers as well as some interference suppression capability to the receiver. However, if different signals transmitted on the different antennas use different codes, then the code resource is used up quickly. Consequently, this model accomplishes little gain in the data rate.

Thus, a need arises to overcome the limitation of using different code sequences to encode data for each of multiple antennas.

Capacity is limited by the number of available codes. In particular, orthogonal or at least quasi-orthogonal code sequences must be used for each unique data stream being communicated. However, the number of orthogonal or quasi-orthogonal code sequences is limited for a given code sequence length.

Thus the capacity of the communication system is limited. Consequently, a need arises for a method to satisfy additional transmission capacity while overcoming the limitation of different encoding sequences required for each data stream.

SUMMARY OF INVENTION

In this invention, information symbols are transmitted simultaneously on independent streams using the same spreading code but from different transmit antennas at the transmitter. These simultaneous data stream could be intended for the same user (and thereby the data rate for any particular user can be increased) or for different users (thereby increasing the system capacity). Each stream of data can belong to a different signal constellation and use a different channel code. At the receiver, a number of receive antennas equal to at least the number of multiple data streams is used to separate the different data streams. We consider two different cases. The first one when no transmit diversity is used (this case can also include the case when transmit diversity with simple antenna weighting is used) and the second when transmit diversity with space-time block coding is used.

DETAILED DESCRIPTION OF THE INVENTION

Figure 1:
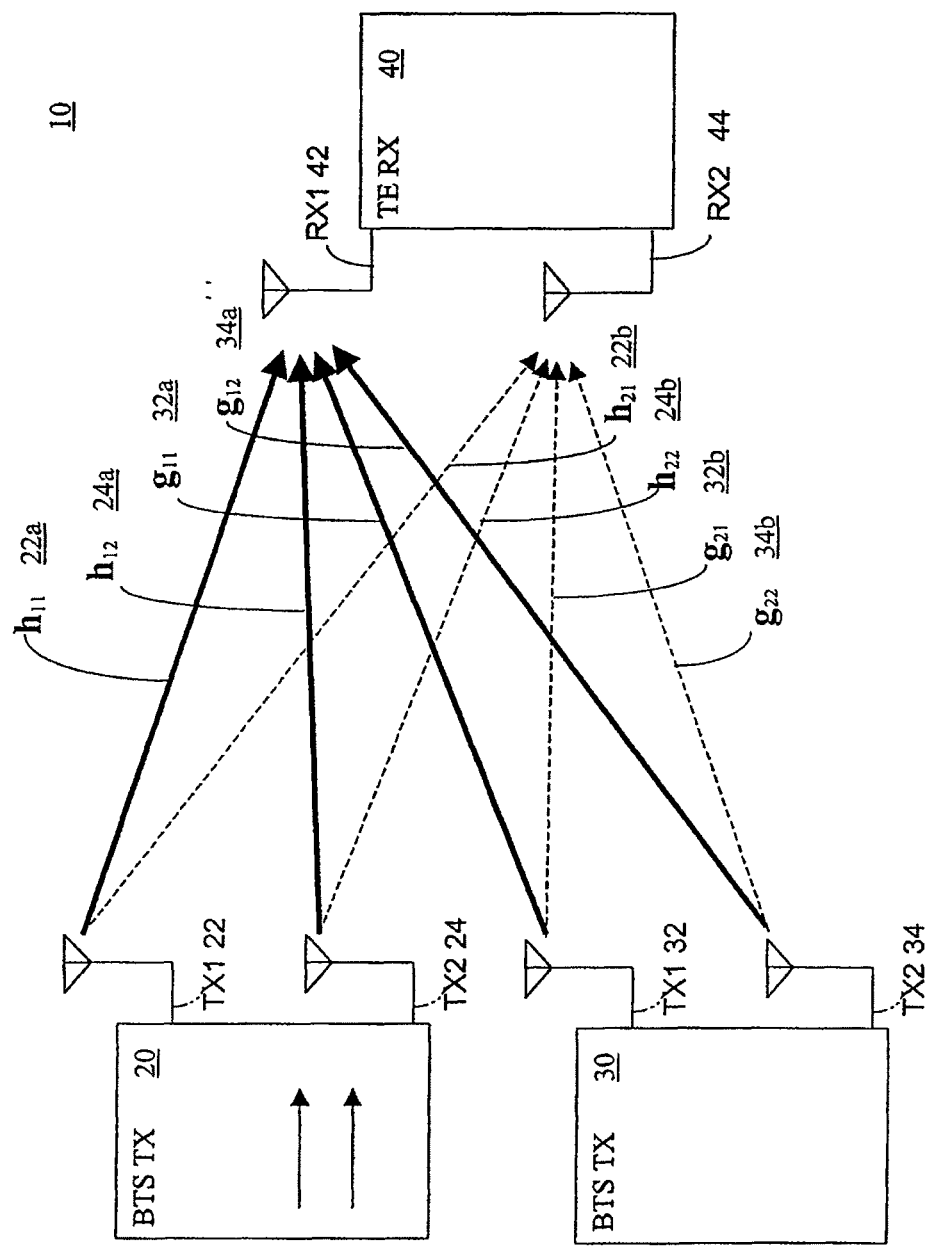
FIG. 1 is a schematic representation of an illustrative communication system that practices the invention.

FIG. 1 is a schematic representation of apparatus 10 for use in practicing the invention. Apparatus 10 comprises at least first and second transmitters 20, 30 and a receiver 40. Transmitter 20 has at least first and second antennas 22, 24 for transmitting signals; and transmitter 30 also has at least first and second antennas 32, 34 for transmitting signals. Receiver 40 has at least first and second antennas 42, 44 for receiving signals. The characteristics of the signal path from the first transmitter to the receiver are represented by the value $h_{ij}$ where i identifies the receiver antenna number and j identifies the transmitter antenna number. Similarly, the characteristics of the signal path from the second transmitter to the receiver are represented by the value $g_{ij}$.

The invention may be practiced using additional antennas and additional transmitters but the number of antennas at the receiver 40 must be equal to at least the number of transmitters.

As illustrated in FIG. 1, transmitters 20, 30 are located at base stations and receiver 40 is depicted as terminal equipment such as a mobile station. However, the invention may also be practiced in other configurations such as one where the transmitters are located at terminal equipment that are synchronized and the receiver at a base station.

Figure 2:
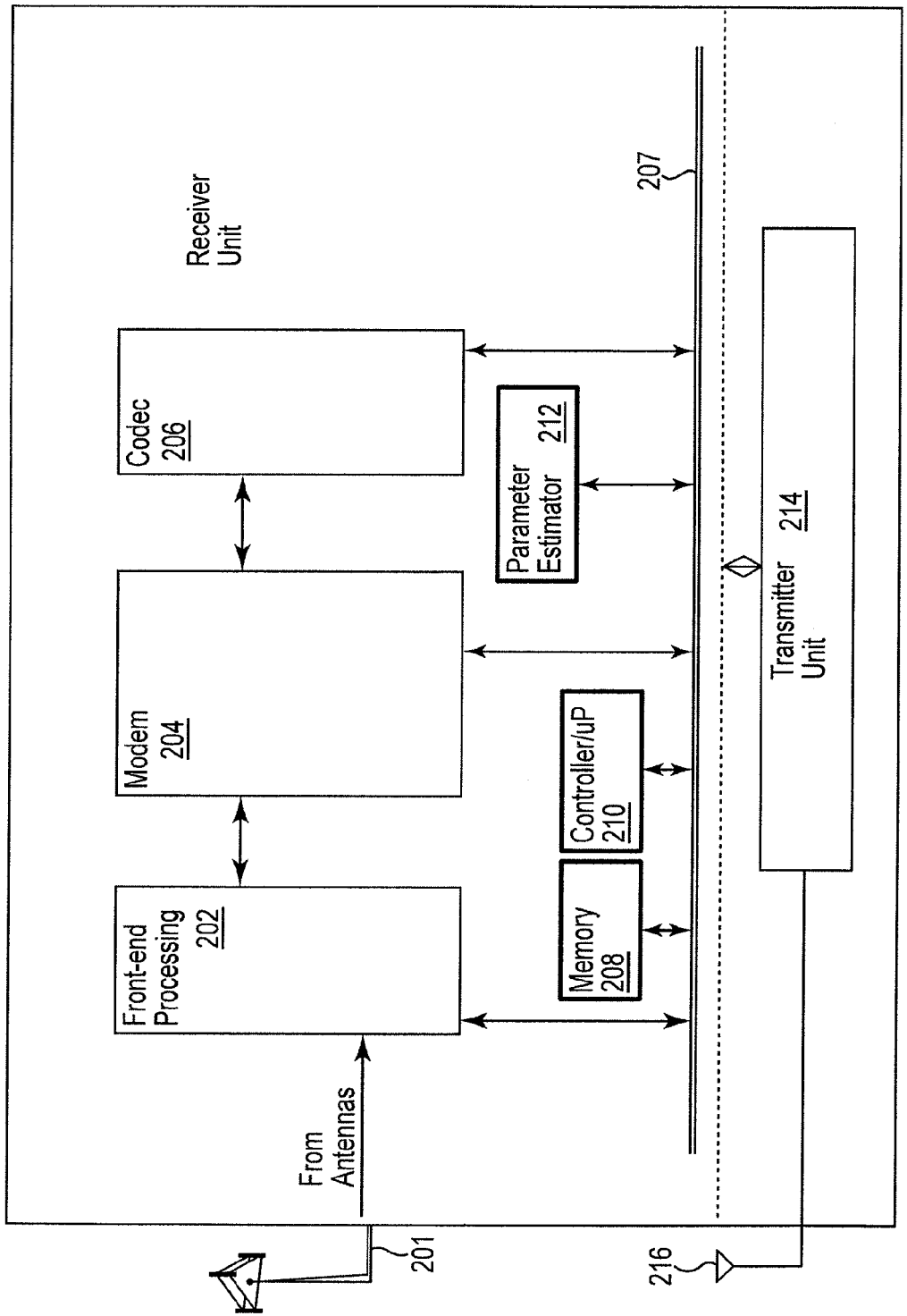
FIG. 2 is a block diagram of a transceiver that may be used in the practice of the invention.

FIG. 2 depicts the major functions of an illustrative transceiver 200 that may be used in practicing the invention. Transceiver 200 comprises a receiver unit which includes a front-end processing block 202, a modem 204 for demodulating the received signal, a codec 206 for decoding the received signal, a memory 208 and a parameter estimator block 212. These elements are interconnected by a bus 207 and are controlled by a controller/microprocessor 210. Signals received at antenna 201 are supplied to front-end processing block 202 and processed further by modem 204 and codec 206 under control of controller/microprocessor 210 and programs stored in memory 208. Transmitter 214 has functional elements similar to those of the receiver section but operating in the opposite direction to generate a coded modulated signal that is provided to antenna 216 for transmission.

General details about the operation of transceivers of the type shown in FIG. 2 are well known. Specific details of the operation of such transceivers in the context of the present invention are set forth in the following discussion.

Figure 3:
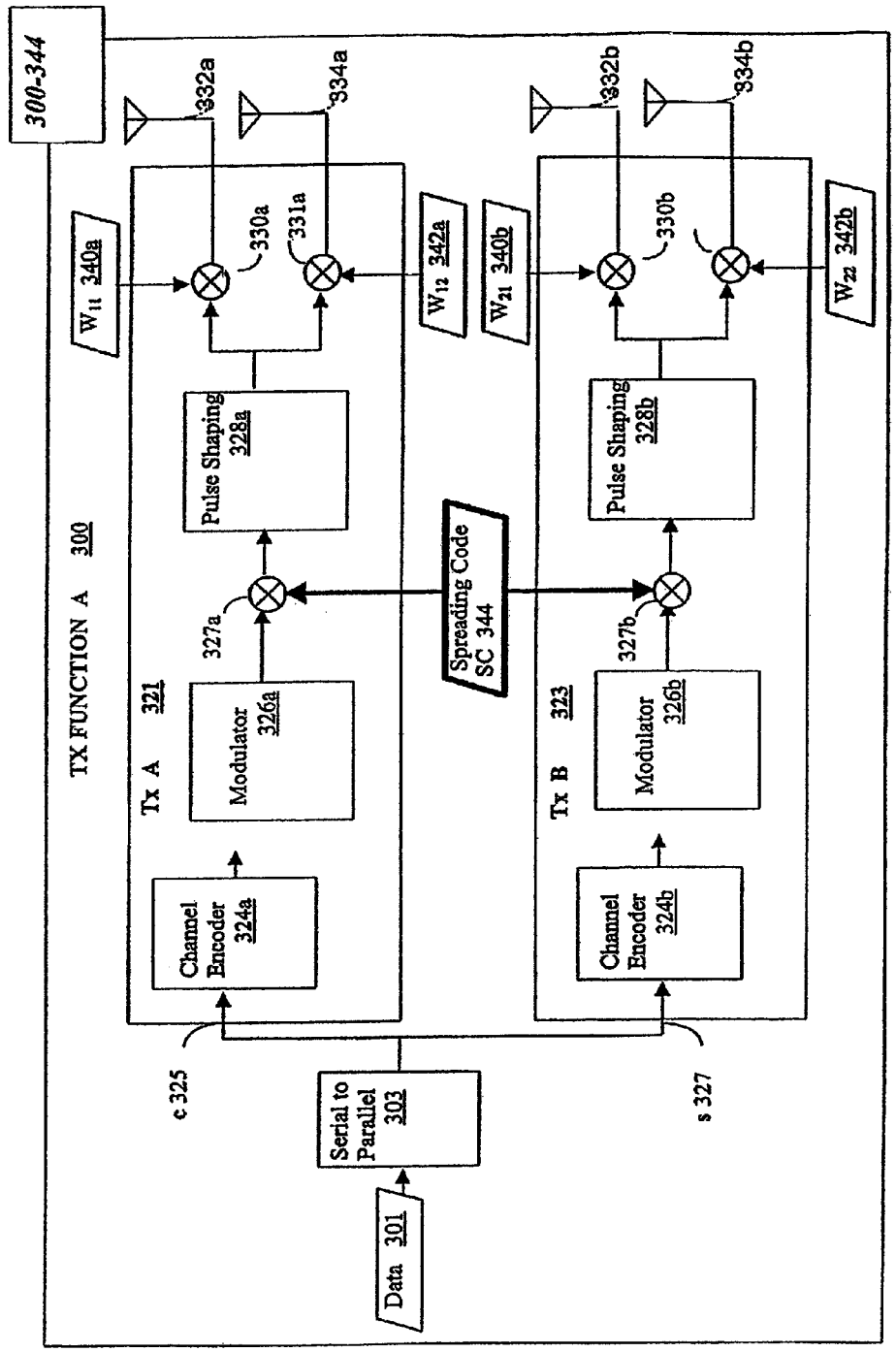
FIG. 3 is a block diagram of a pair of transmitters for use in practicing the invention.

An illustrative embodiment of a pair of 3GPP transmitters 321, 323 for use in practicing the invention is depicted in FIG. 3. As shown therein, transmitter 321 comprises a channel encoder 324a, a modulator 326a, a multiplier 327a, a pulse shaper 328a, and two multipliers 330a and 331a. Transmitter 323 comprises the same functional elements which have been numbered the same but with a "b" suffix. While the elements of the two transmitters are functionally the same, the channel encoder 324a, 324b may use different channel codes and even different coding schemes; and the modulators 326a, 326b may use different signal constellations. The output of each modulator is a modulated signal that is suitable for spreading when multiplied by a spreading code in multiplier 327a or 327b.

Also shown in FIG. 3 is a source 344 that provides the same spreading code to both multiplier 327a and multiplier 327b.

Also shown are sources 340a, 342a, 340b, and 342b of weight $w_{11}$, $w_{12}$, $w_{21}$ and $w_{22}$, respectively, which are provided to multipliers 330a, 331a, 330b, and 331b.

In operation, a data stream from a source 301 is provided to a serial to parallel converter 303 that splits the data stream into first and second parallel data streams 325 and 327, illustratively, by directing every other data symbol to transmitter 321 and the remaining data symbols to transmitter 323. In FIG. 3, the data symbols directed to transmitter 321 are represented by the symbol "c" and the data symbols directed to transmitter 323 are represented by the symbol "s".

The first data stream is encoded by channel encoder 324a, modulated by modulator 326a and spread by multiplier 327a to form a first spread data stream. The spread data stream is then pulse shaped by pulse shaper 328a and the resulting signal is applied in parallel to multipliers 330a and 331a which weight the parallel signals by multiplying them with weights $w_{11}$ and $w_{12}$. The weighted spread data streams are then supplied to antennas 332a and 334a for transmission.

The second data stream is processed in similar fashion using the elements of transmitter 323 to produce a second spread data stream that has been spread with the same spreading code; and the second spread data stream is then applied in parallel to multipliers 330b and 331b which weight the parallel signals with weights $w_{21}$ and $w_{22}$. The weighted spread data streams are then supplied to antennas 332b and 334b for transmission.

Figure 4A:
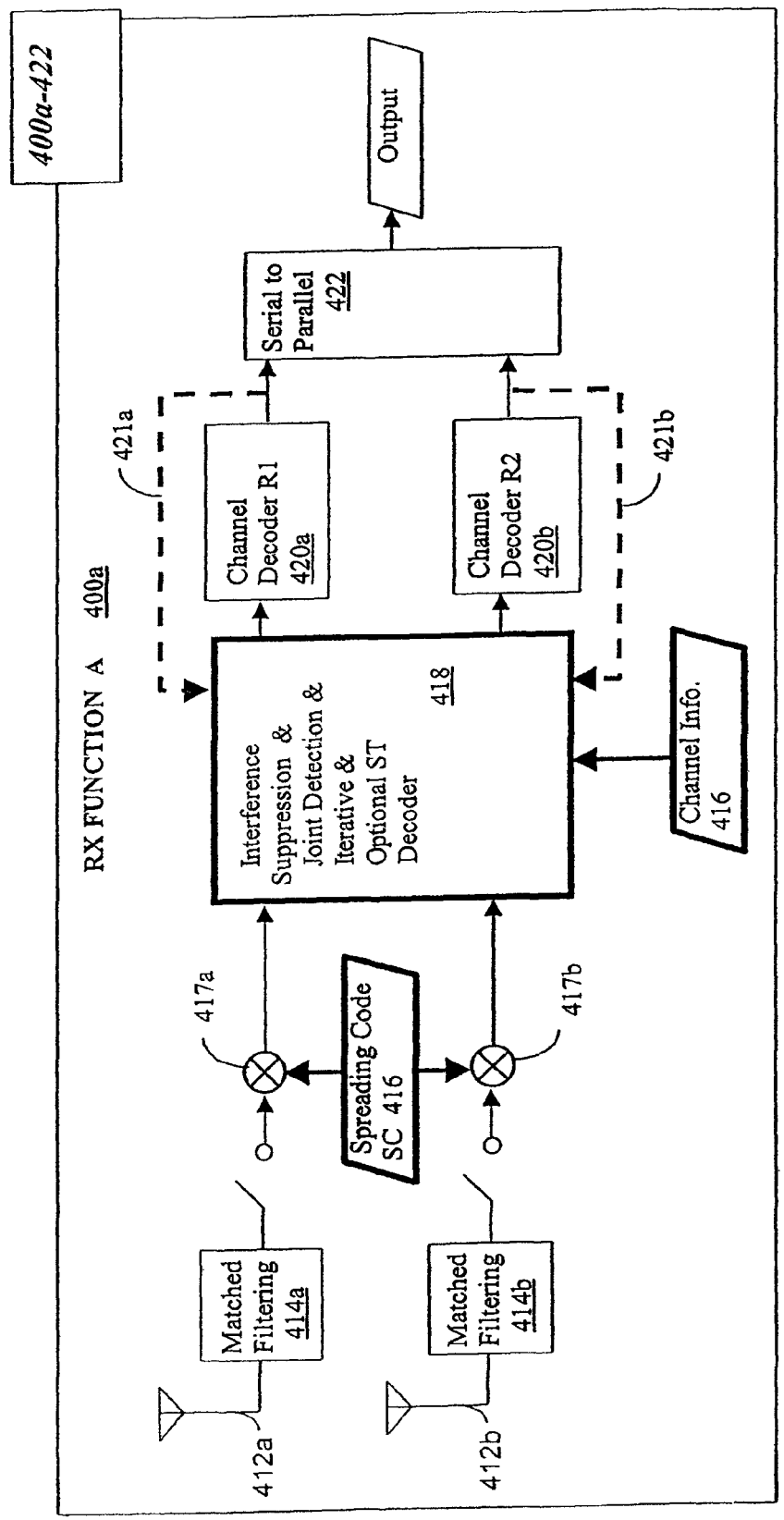
FIG. 4A is a block diagram of a receiver used in practicing the invention.

An illustrative embodiment of a receiver 400 for receiving signals from multiple transmitters of the type shown in FIG. 3 is shown in FIG. 4A. Receiver 400 comprises first and second matched filters 414a, 414b, a source 416 of a spreading code, first and second multipliers 417a, 417b, a signal processing block 418, first and second channel decoders 420a, 420b, and a parallel to serial converter 422. Optional feedback paths 421a and 421b provide decoded signals to signal processing block 418 that may be used for turbo decoding. To recover the data stream that is transmitted from the transmitters of FIG. 3, the spreading code supplied by source 416 is the same as that supplied by source 344.

Transmitted signals are received at antennas 412a, 412b. The signals received at each antenna comprise the signals transmitted from all the antennas of all the transmitters communicating with the receiver. The signals received at each antenna are filtered by matched filter 414a or 414b and despread by multiplier 417a or 417b using the same spreading code. As a result, first and second despread signals are supplied to processing block 418. In the system of the present invention, each despread signal contains information about both the first and second data streams originally supplied to transmitters 321 and 323.

Processing block 418, which is shown in more detail in FIGS. 4B, 4C, 5A, 5B and 6 below, suppresses signal interference and detects the data symbols of the first and second data streams in the received signals. These signals are then supplied to channel decoders 420a, 420b which decode the signals. The output of the decoders can then be recombined by parallel to serial converter 422 into a single serial stream, if desired, to reconstitute the original data stream delivered from source 301.

Figure 4B:
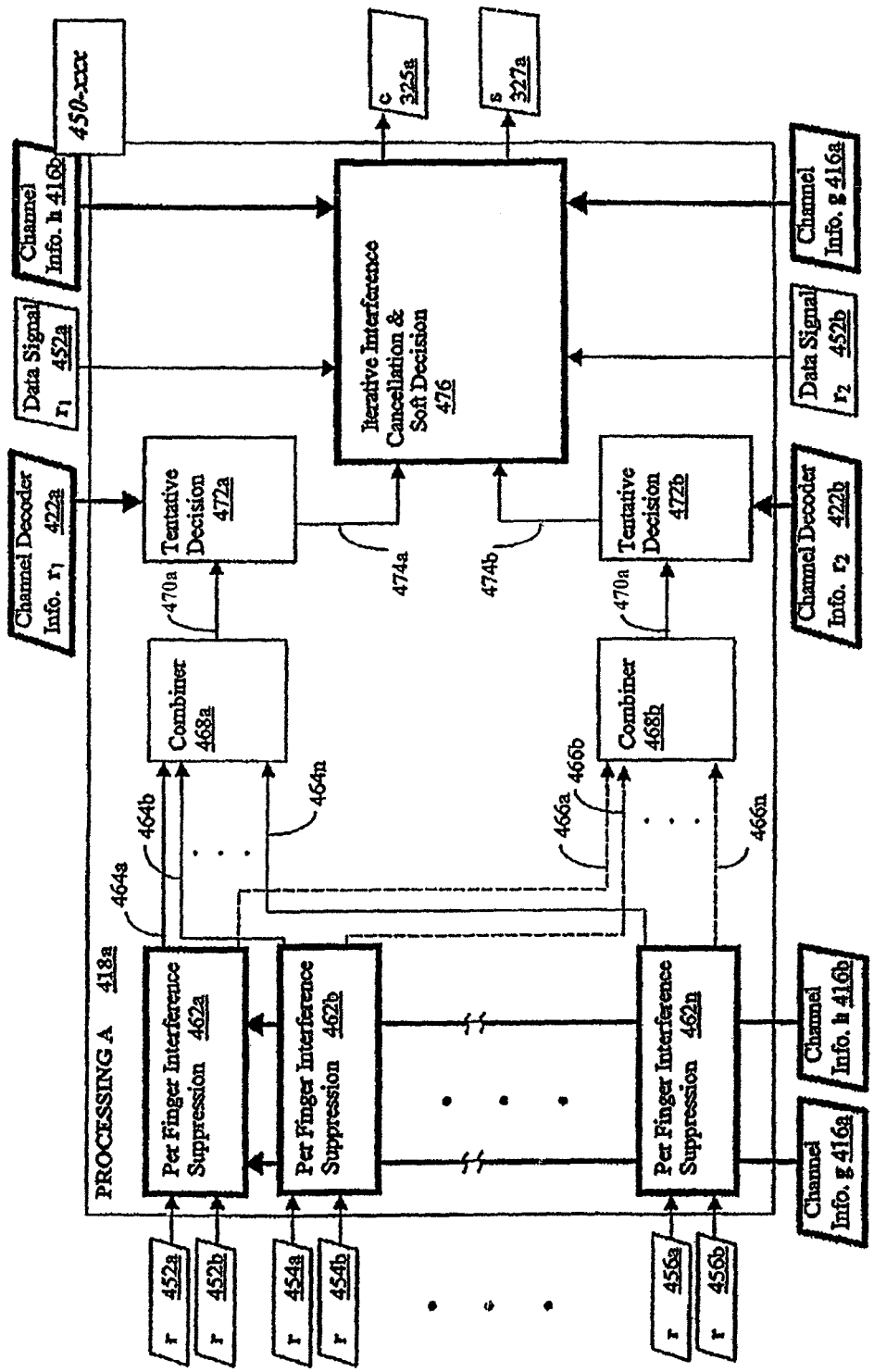
FIG. 4B is a block diagram of details of a first embodiment of the receiver of FIG. 4A.

Further details of one embodiment of processing block 418 are shown in FIG. 4B. Processing block 418 comprises a plurality of per finger interference suppression blocks 462a-462n, first and second combiners 468a, 468b, first and second tentative decision blocks 472a, 472b, and interference cancellation and soft decision block 476.

The signals at the output of multipliers 417a, 417b include multipath signals that have propagated along different paths from the transmitters to the receiver and consequently have arrived at slightly different times. The stronger of these signals are supplied to different fingers of processing block 418. The multipath signals from the first multiplier 417a are identified by the numbers 452a, 454a, ... 456a and those from the second multiplier 417b by numbers 452b, 454b, ... 456b. For each finger, one signal from the first multiplier and one signal from the second multiplier are supplied to a per finger interference suppression block 462. Channel information g about the channel from the second transmitter to the receiver and channel information h about the channel from the first transmitter to the receiver are supplied to all the per finger interference suppression blocks 462a, 462b, ... 462n from sources 416a and 416b.

Each per finger interference suppression block makes a preliminary decision as to the values of both the first and second data streams in the received signals and supplies these decisions via lines 464a-n and 466a-n to combiners 468a and 468b, respectively. Combiners 468a and 468b combine the preliminary decisions from the per finger interference suppression blocks 462a-n and supply the results via lines 470a, 470b to tentative decision blocks 472a, 472b. Channel decoder information is also supplied to blocks 472a, 472b, from sources 422a, 422b. The output of tentative decision blocks 472a, 472b is an estimate of the received signal and its reliability. This information is supplied via lines 474a and 474b to the iterative interference cancellation and soft decision block 476. Channel information from sources 416a and 416b and received data signals from multipliers 417a and 417b are also supplied to block 476. Illustratively, the data signals are the signals 452a and 452b which are also supplied to the first per finger interference suppression block 462a. From this information, block 476 makes a soft decision as to the value of the first and second data streams in the received signals.

To understand the operation of processing block 418, it is helpful to represent the signal processing in mathematical terms.

The signal received at antenna i can be written in the form $$r_i(k, l) = \int_{\tau_l+kT}^{\tau+(k+1)T} r_i(t) \cdot c(t-\tau_l) \cdot dt, \quad i=1,2 \qquad [1]$$

for the kth symbol and the lth finger. This can be rewritten as:

$$r_i(k,l) = \tilde{h}_i(l) \cdot c(k) + \tilde{g}_i(l) \cdot s(k) + n_i(k,l) \quad i=1,2 \qquad [2]$$

where $\tilde{h}$ and $\tilde{g}$ are the channel gains for the channel from the first transmitter to the receiver and the channel from the second transmitter to the receiver.

In the case of 3GPP, $$\tilde{h}_i(l) = w_{11} \cdot h_{i1}(l) + w_{12} \cdot h_{i2}(l), \text{ where } \|w_{11}\|^2 + \|w_{12}\|^2 = 1 \qquad [3]$$

$$\tilde{g}_i(l) = w_{21} \cdot g_{i1}(l) + w_{22} \cdot g_{i2}(l), \text{ where } \|w_{21}\|^2 + \|w_{22}\|^2 = 1 \qquad [4]$$

where $w_{11}$, $w_{12}$ are the weights applied to the signals from transmitter 321 and $w_{21}$, $w_{22}$ are the weights applied to the signals from transmitter 323.

On a per-finger signal model, for two antennas at the receiver, equation 2 can be rewritten as:

$$r_l = \begin{bmatrix} r_1(l) \\ r_2(l) \end{bmatrix} = \begin{bmatrix} \tilde{h}_1(l) & \tilde{g}_1(l) \\ \tilde{h}_2(l) & \tilde{g}_2(l) \end{bmatrix}_{2x2} \begin{bmatrix} c \\ s \end{bmatrix}_{2x1} + \begin{bmatrix} n_1(l) \\ n_2(l) \end{bmatrix}_{2x1} \qquad [5]$$

And the overall signal model can be written as $$r_{i,LX1} = \begin{bmatrix} r_i(1) \\ r_i(2) \\ \ldots \\ r_i(L) \end{bmatrix} = \begin{bmatrix} \tilde{h}_i(1) & \tilde{g}_i(1) \\ \tilde{h}_i(2) & \tilde{g}_i(2) \\ \ldots & \ldots \\ \tilde{h}_i(L) & \tilde{g}_i(L) \end{bmatrix} \begin{bmatrix} c \\ s \end{bmatrix} + \begin{bmatrix} n_i(1) \\ n_i(2) \\ \ldots \\ n_i(L) \end{bmatrix}, \quad i=1,2 \qquad [6]$$

or $$r_{2LX1} = \begin{bmatrix} r_1 \\ r_2 \end{bmatrix} = \begin{bmatrix} \tilde{h}_1 & \tilde{g}_1 \\ \tilde{h}_2 & \tilde{g}_2 \end{bmatrix}_{2Lx2} \begin{bmatrix} c \\ s \end{bmatrix}_{2X1} + \begin{bmatrix} n_1 \\ n_2 \end{bmatrix}_{2LX1}, \quad i=1,2 \qquad [7]$$

We define a correlation matrix R for each finger as $$R_{l,2x2} = H_l H_l^* + \frac{1}{\Gamma_l} \cdot I \qquad [8]$$

where $$H_{l,2x2} = \begin{bmatrix} \tilde{h}_1(1) & \tilde{g}_1(1) \\ \tilde{h}_2(1) & \tilde{g}_2(1) \end{bmatrix}_{2Lx2}, \quad i=1,2 \qquad [9]$$

H* is the conjugate transpose of H, I is the identity matrix, and $\Gamma_l$ is the signal to noise ratio in finger l. Further, we define $$\tilde{h}_l = \tilde{h}(l) = [\tilde{h}_1(l) \tilde{h}_2(l)]^T \text{ and } \tilde{g}_l = \tilde{g}(l) = [\tilde{g}_1(l) \tilde{g}_2(l)]^T \qquad [10]$$

To obtain estimates of the values $c_l$ and $s_l$ for each finger l we need to find a set of weights $$w_{c,l} = R_l^{-1} \cdot \tilde{h}_l \quad w_{s,l} = R_l^{-1} \cdot \tilde{g}_l \qquad [11]$$

such that $$c_l = w_{c,l}^* \cdot r_l = c + \eta_{c,l} \quad s_l = w_{s,l}^* \cdot r_l = s + \eta_{s,l} \qquad [12]$$

where $r_l$ is the received signal as specified by equation [2] and $\eta$ is the effective noise. As indicated, these weights are obtained by determining the correlation matrix R, inverting the correlation matrix and multiplying it by $\tilde{h}(l)$ or $\tilde{g}(l)$.

Figure 5A:
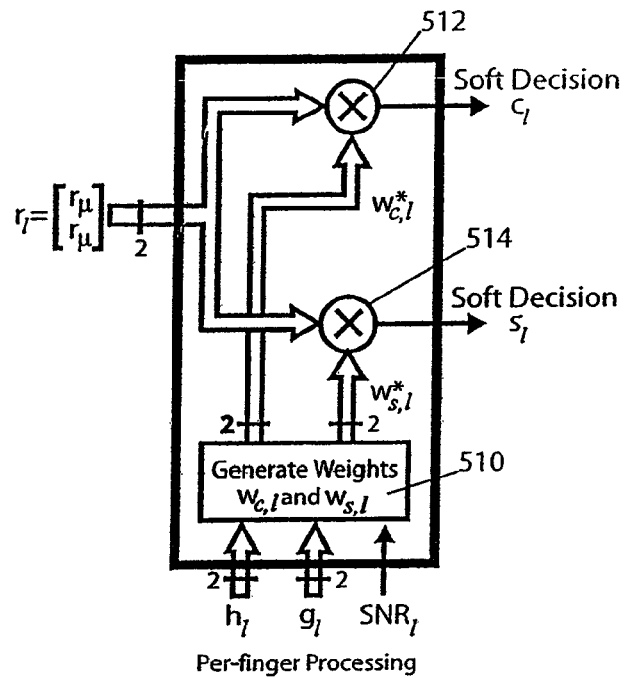
FIG. 5A is a block diagram of a further detail of the block diagram of FIG. 4B.
Figure 5B:
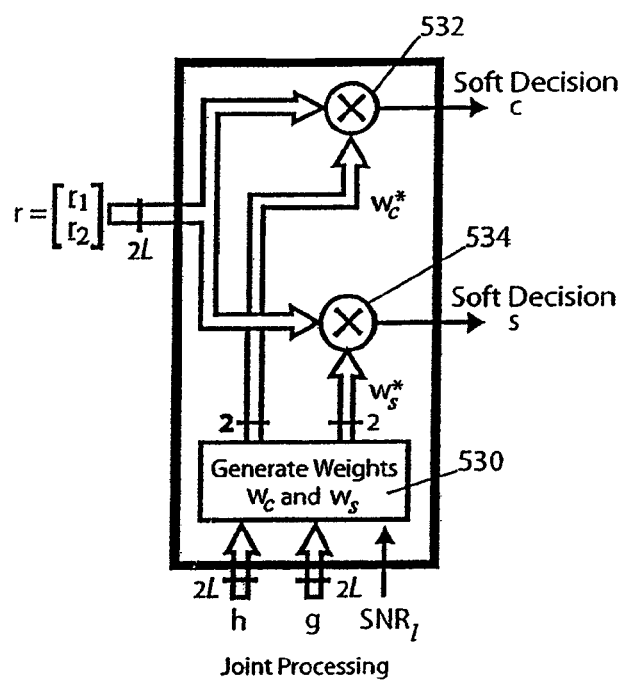
FIG. 5B is a block diagram of a further detail of the block diagram of FIG. 4C.

Illustrative apparatus for calculating the values $c_l$ and $s_l$ is shown in FIG. 5A. The apparatus comprises a weight generation block 510 and multipliers 512 and 514. Inputs to the weight generation block include the channel information specified in equation [9] and the signal to noise ratio or an estimate thereof. The received signal $r_l$ is then multiplied by multipliers with weighting signals generated by block 510 as specified in equation [12].

The values $c_l$ and $s_l$ are supplied from each per finger interference suppression block 462a-n over lines 464a-n and 466a-n to combiners 468a and 468b where they are combined. The combined signals are then supplied to tentative decision blocks 472a and 472b where a minimum mean square error computation is performed to locate the minimum distance between the received signal and a point in the signal constellation. This computation is represented mathematically by $$c_{tsd} = \underset{c_c \in C_c}{\operatorname{argmin}} \sum_{l=1}^{L} \|w_{c,l}^* \cdot r_l - c_c^2\| \qquad [13]$$

$$s_{tsd} = \underset{s_c \in S_c}{\operatorname{argmin}} \sum_{l=1}^{L} \|w_{s,l}^* \cdot r_l - s_c\|^2$$

In addition, the reliabilities, $d_c$ and $d_s$, of the estimates of c and s are also computed according to the formulas $$d_c = \sum_{l=1}^{L} \|w_{c,l}^* \cdot r_l - \hat{c}\|^2 \qquad [14]$$

$$d_s = \sum_{l=1}^{L} \|w_{s,l}^* \cdot r_l - \hat{s}\|^2$$

The lower the value of $d_c$ or $d_s$, the more reliable is the estimate.

The output of tentative decision block 472a is a noisy estimate of the received signal c and the reliability of this estimate, $d_c$; and the output of tentative decision block 472b is a noisy estimate of the received signal s and its reliability, $d_s$. This information is supplied to iterative interference cancellation and soft decision block 476.

Figure 6:
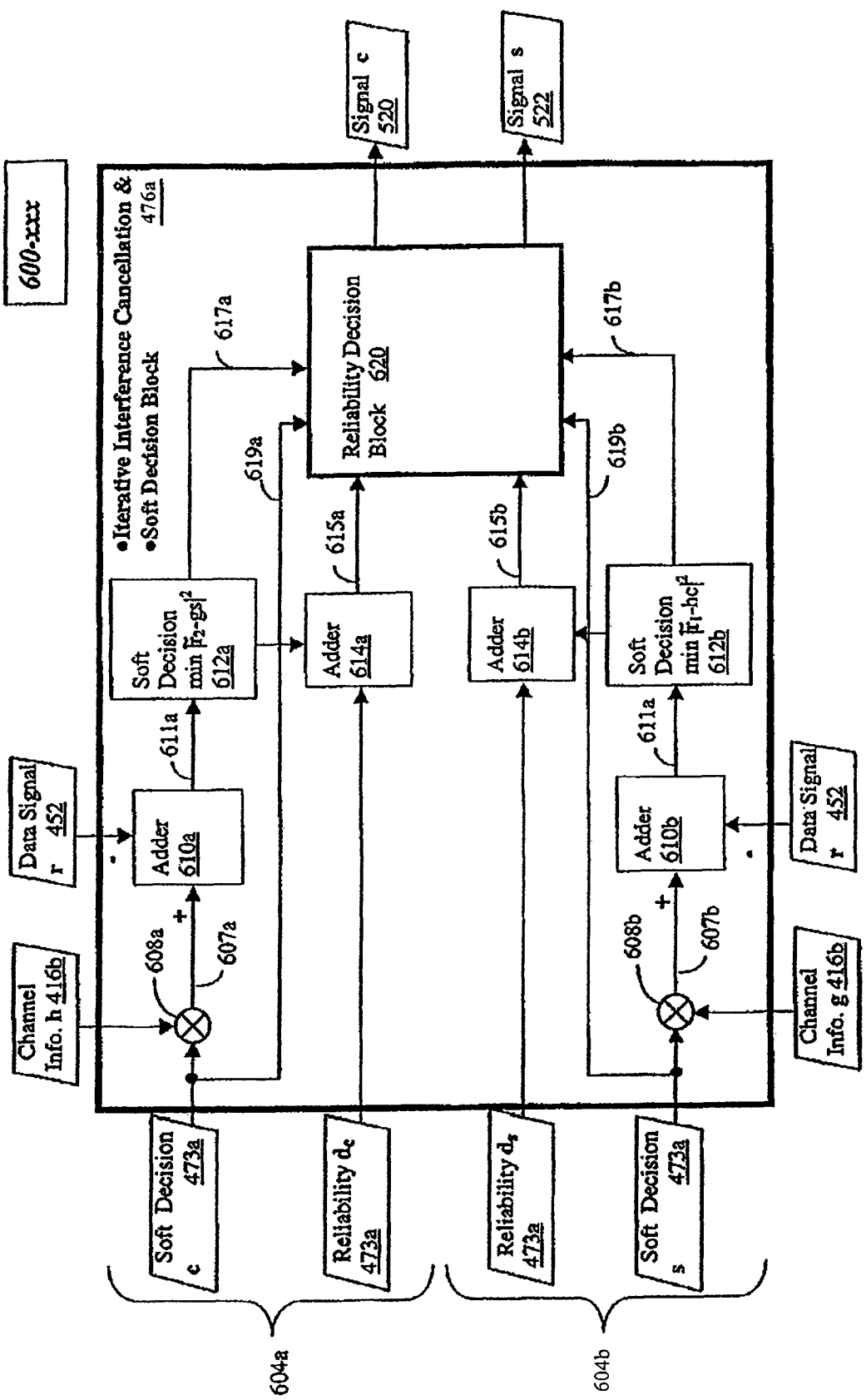
FIG. 6 is a block diagram of another detail of the receiver of FIG. 4A.
Figure 7:
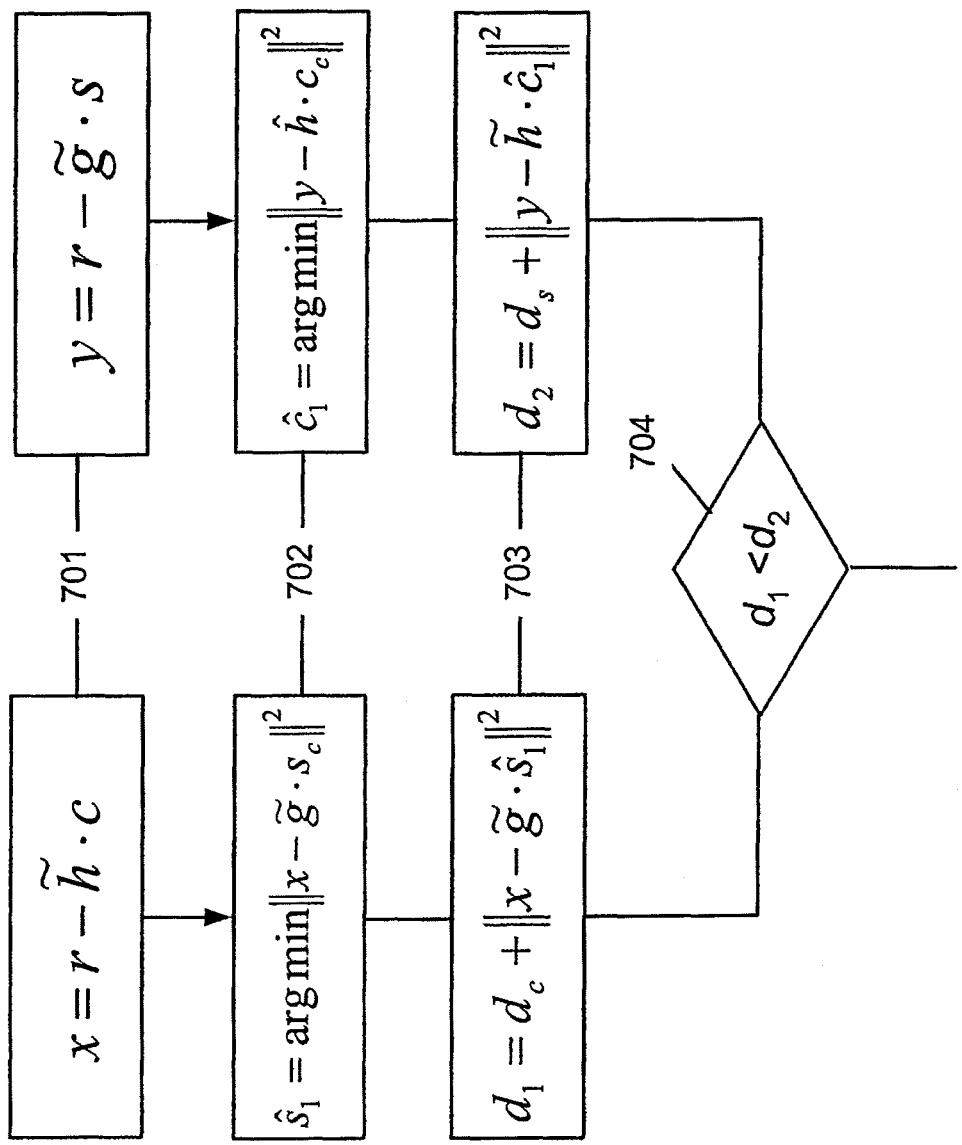
FIG. 7 is a flow chart useful in understanding the operation of FIG. 6.

The iterative interference cancellation and soft decision block 476 is shown in detail at FIG. 6. This block performs the same operations on the signals received from tentative decision blocks 472a and 472b, compares the results and picks the better one. In particular, as shown in FIG. 7, at step 701 it subtracts from the total received signal, r, the contribution to that signal arising from the estimated signal c or s and the associated channel gain $\tilde{h}$ or $\tilde{g}$. What is left over is the contribution to the total received signal from the other signal and from noise. At step 702 it then makes an estimate of the value of the other signal using the same mean square error test used in the tentative decision blocks and also calculates the reliability of that estimate. At step 703 it then sums the calculated reliability for one symbol with the received reliability for the other symbol and at step 704 compares the two sums. The lower sum determines the final decision as to the value of the received signal.

The apparatus of FIG. 6 comprises first and second multipliers 608a, 608b, first and second adders 610a, 610b, first and second soft decision blocks 612a, 612b, third and fourth adders 614a, 614b and reliability decision block 620. Inputs include the soft decisions c and s, and reliabilities $d_c$ and $d_s$, the channel information h and g and the received signal r. Multiplier 608a multiplies the channel information h and the estimated signal c; and adder 610a determines the difference between the received signal and the contribution to that signal arising from the estimated signal c and the channel gain h. This calculation is represented as:

$$x_{2L \times 1} = r - \tilde{h} \cdot \hat{c} \qquad [15]$$

Soft decision block 612a then makes a new estimate $s_l$ of the signal s using a minimum mean square error determination. This is represented by $$\hat{s}_1 = \underset{s_c \in S_c}{\operatorname{argmin}} \|x - \tilde{g} \cdot s_c\|^2 \qquad [16]$$

Next, the overall reliability $d_1$ for the new estimate of s and the received estimate of c is determined by calculating the reliability for the new estimate of s and summing it at adder 614a with $d_c$. This is represented by $$d_1 = d_c + \|x - \tilde{g} \cdot \hat{s}_1\|^2 \qquad [17]$$

In like fashion, a new estimate of c can be determined and the overall reliability $d_2$ of the new estimate of c and the received estimate of s can also be determined by multiplier 608b, adders 610b, 614b and soft decision block 612b, implementing the following equations:

$$y_{2L \times 1} = r - \tilde{g} \cdot \hat{s} \qquad [18]$$

$$\hat{c}_1 = \underset{c_c \in C_c}{\operatorname{argmin}} \|y - \tilde{h} \cdot c_c\|^2 \qquad [19]$$

$$d_2 = d_s + \|y - \tilde{h} \cdot \hat{c}_1\|^2 \qquad [20]$$

Finally, $d_1$ and $d_2$ are compared by reliability decision block 620. If $d_1 < d_2$, then the new estimate of s and the original estimate of c are accepted and supplied as the outputs of the receiver. If $d_2 < d_1$, then the new estimate of c and the original estimate of s are accepted and supplied as the outputs of the receiver.

Figure 4C:
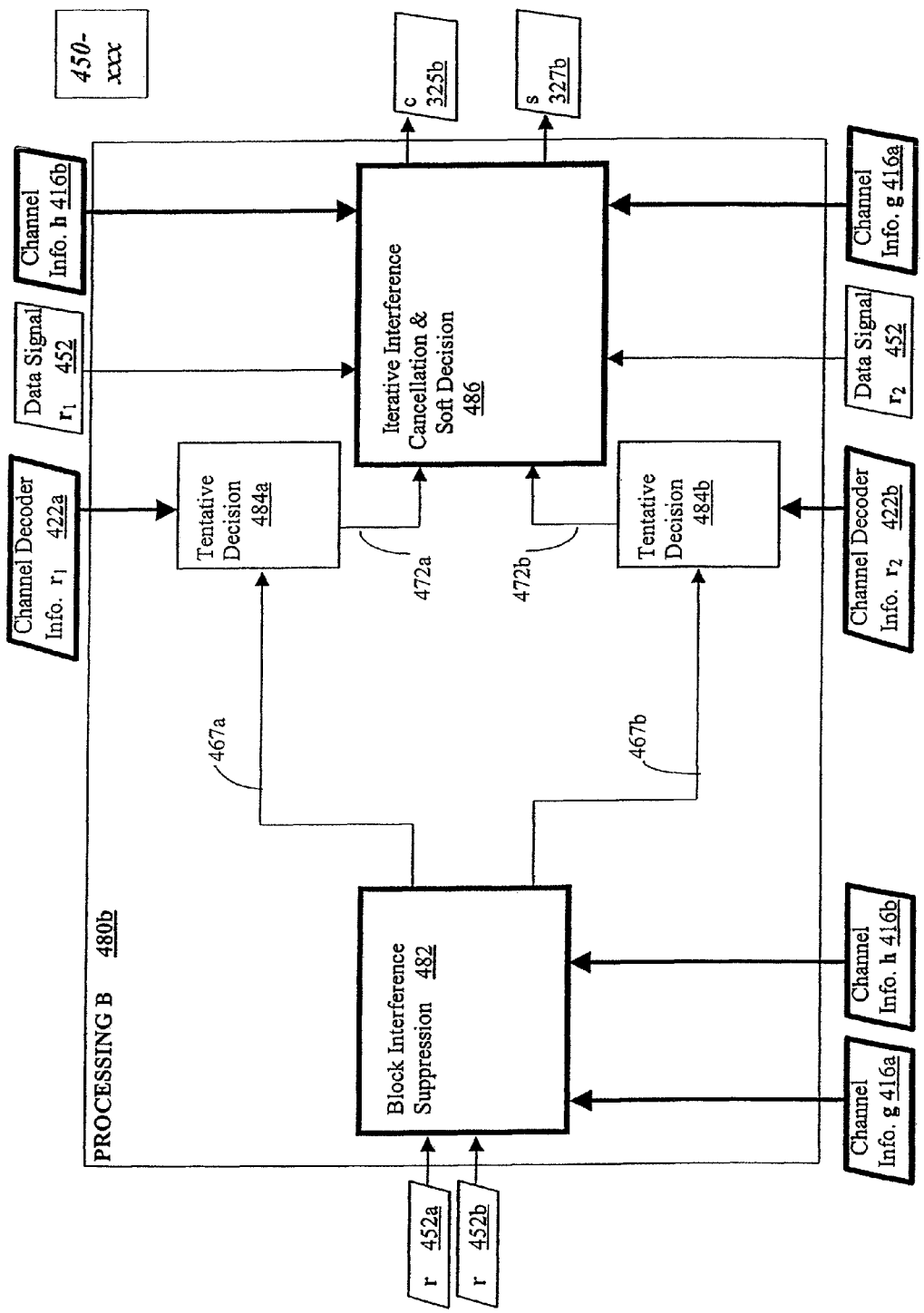
FIG. 4C is a block diagram of details of a second embodiment of the receiver of FIG. 4A.

FIG. 4C depicts an alternative receiver 480 to that of FIG. 4B. In this case, interference suppression is performed on a block basis rather than a per finger basis. Receiver 480 comprises a block interference suppression and combining subsystem 482, first and second tentative decision blocks 484a, 484b and interference cancellation and soft decision block 486. The inputs to receiver 480 and the outputs therefrom are the same as those of receiver 418 of FIG. 4B.

Details of the block interference suppression and combining subsystem 982 are set forth in FIG. 4B. The subsystem comprises a weight generation block 530 and multipliers 532 and 534. This subsystem is similar to the interference suppression block of FIG. 5A but the number of data signal inputs, and g and h channel gain inputs in each case is 2L where L is the number of fingers. In contrast, each interference suppression block of FIG. 5A has 2 data signal inputs and 2 inputs each for the G and H channel information.

Similarly, the mathematical representation of the processing performed in subsystem 482 is similar to that of block 462 but the matrices are much larger. Thus, the correlation matrix R is defined by $$R_{2L \times 2L} = HH^* + \frac{1}{\Gamma_l} \cdot I \qquad [21]$$

where $$H_{2L \times 2} = \begin{bmatrix} \tilde{h}_1 & \tilde{g}_1 \\ \tilde{h}_2 & \tilde{g}_2 \end{bmatrix} \qquad [22]$$

Further, we define $$h_{2L \times 1} = \begin{bmatrix} \tilde{h}_1 \\ \tilde{h}_2 \end{bmatrix} \qquad [23]$$

$$g_{2L \times 1} = \begin{bmatrix} \tilde{g}_1 \\ \tilde{g}_2 \end{bmatrix}$$

To obtain estimates of the values of c and s we need to final a set of weights $$w_c = R^{-1} \cdot \tilde{h} w_s = R^{-1} \cdot \tilde{g} \qquad [24]$$

such that $$c = w_c^* \cdot r = c + \eta_c s = w_s^* \cdot r = s + \eta_s \qquad [25]$$

The estimates of c and s are supplied from subsystem 482 to tentative decision blocks 484a and 484b; and the operation of these blocks and the interference cancellation and soft decision block 486 is the same as that of the corresponding elements in FIG. 4B.

Figure 8:
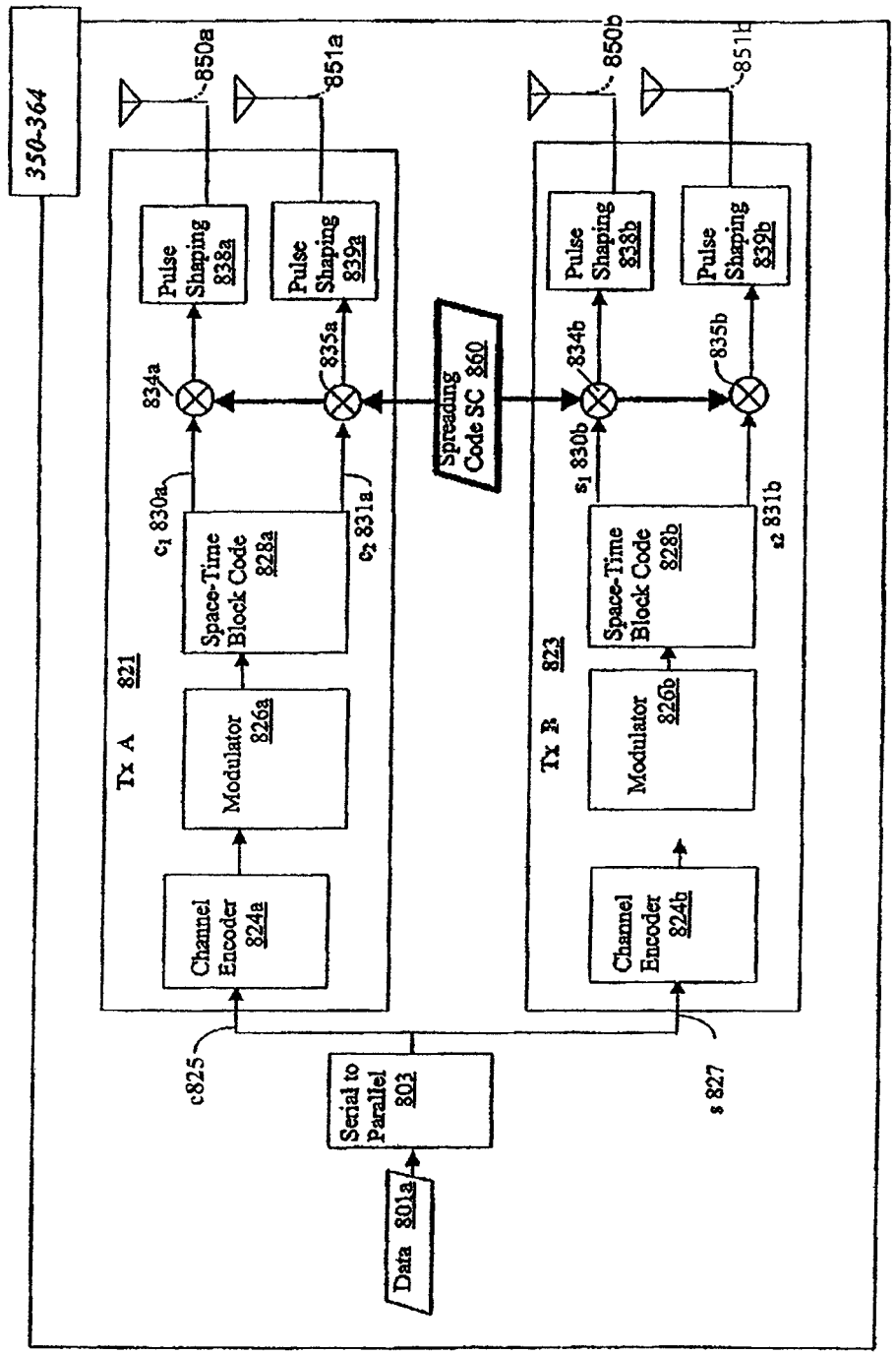
FIG. 8 is a block diagram of a pair of transmitters of an alternative embodiment of the invention.

An alternative embodiment of the invention uses space-time block coding to code the transmitted signals. An illustrative embodiment of a pair of transmitters 821, 823 for use in practicing this embodiment of the invention is shown in FIG. 8. As shown therein, transmitter 821 comprises a channel encoder 824a, a modulator 826a, a space-time block coder 828a, first and second multipliers 834a, 835a, and pulse shapers 838a, 839a. Transmitter 823 comprises the same functional elements which have been numbered the same but with a "b" suffix. While the elements of the two transmitters are functionally the same, the channel encoders 824a and 824b may use different channel codes and even different coding schemes; and the modulators 826a and 826b may use different signal constellations.

Also shown in FIG. 8 is a source 860 that provides the same spreading code to multipliers 834a, 835a, 834b and 835b.

In operation, a data stream from a source 801 is provided to a serial to parallel converter 803 that splits the data stream into first and second parallel data streams 825, 827, illustratively, by directing every other data symbol to transmitter 821 and the remaining data symbols to transmitter 823. In FIG. 8, the data symbols directed to transmitter 821 are represented by the symbol "c" and the data symbols directed to transmitter 823 are represented by the symbol "s".

The first data stream is encoded by channel encoder 824a, modulated by modulator 826a and processed by space-time block coder 828a to produce first and second signals on output lines 830a, 831a. These signals are spread by multipliers 834a, 835a using a spreading code supplied by source 860. The spread signals are then pulse shaped by pulse shapers 838a, 839a and supplied to antennas 850a, 851a for transmission.

The second data stream is processed in similar fashion using the elements of transmitter 823 to produce two more spread data streams that have been spread using the same spreading code as that used to spread the data streams in transmitter 821. The spread signals in transmitter 823 are then pulse shaped and supplied to antennas 850b and 851b for transmission.

Figure 9A:
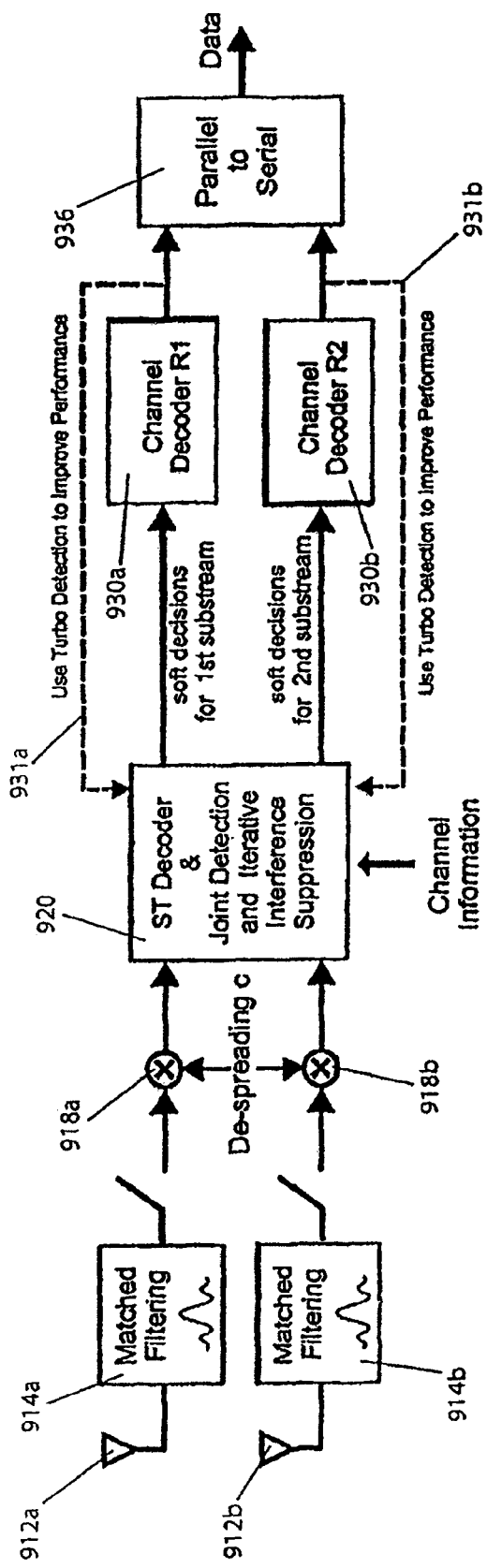
FIG. 9A is a block diagram of a receiver for use in receiving signals transmitted by the transmitter of FIG. 8.

An illustrative embodiment of a receiver 900 for receiving signals from multiple transmitters of the type shown in FIG. 8 is shown in FIG. 9A. Receiver 900 comprises first and second matched filters 914a, 914b, a source 916 of a spreading code, first and second multipliers 918a, 918b, a space and time decoder and joint detection and interference suppression subsystem 920, channel decoders 930a, 930b and parallel to serial converter 936. Optional feedback paths 931a and 931b provide decoded signals to subsystem 920 that may be used for turbo decoding. To recover the data stream that is transmitted from the transmitters of FIG. 8, the spreading code supplied by source 916 is the same as that supplied by source 860.

Transmitted signals are received at antennas 912a, 912b. The signals received at each antenna comprise the signals transmitted from all the antennas of all the transmitters communicating with the receiver. The signals received at each antenna are filtered by matched filter 914a or 914b and despread by multipliers 918a or 918b using the same spreading code. In the system of the present invention, each despread signal contains information about both the first and second data streams originally supplied to transmitters 821 and 823.

Subsystem 920, which is shown in more detail in FIG. 913 below, suppresses signal interference and space-time decodes the received signals. Soft decisions of a first substream and a second substream are supplied to channel decoders 930a and 930b, respectively. The output of the decoders can then be combined by parallel to serial converter 936 into a single data stream, if desired, to reconstitute the original data stream delivered from source 801.

Figure 9B:
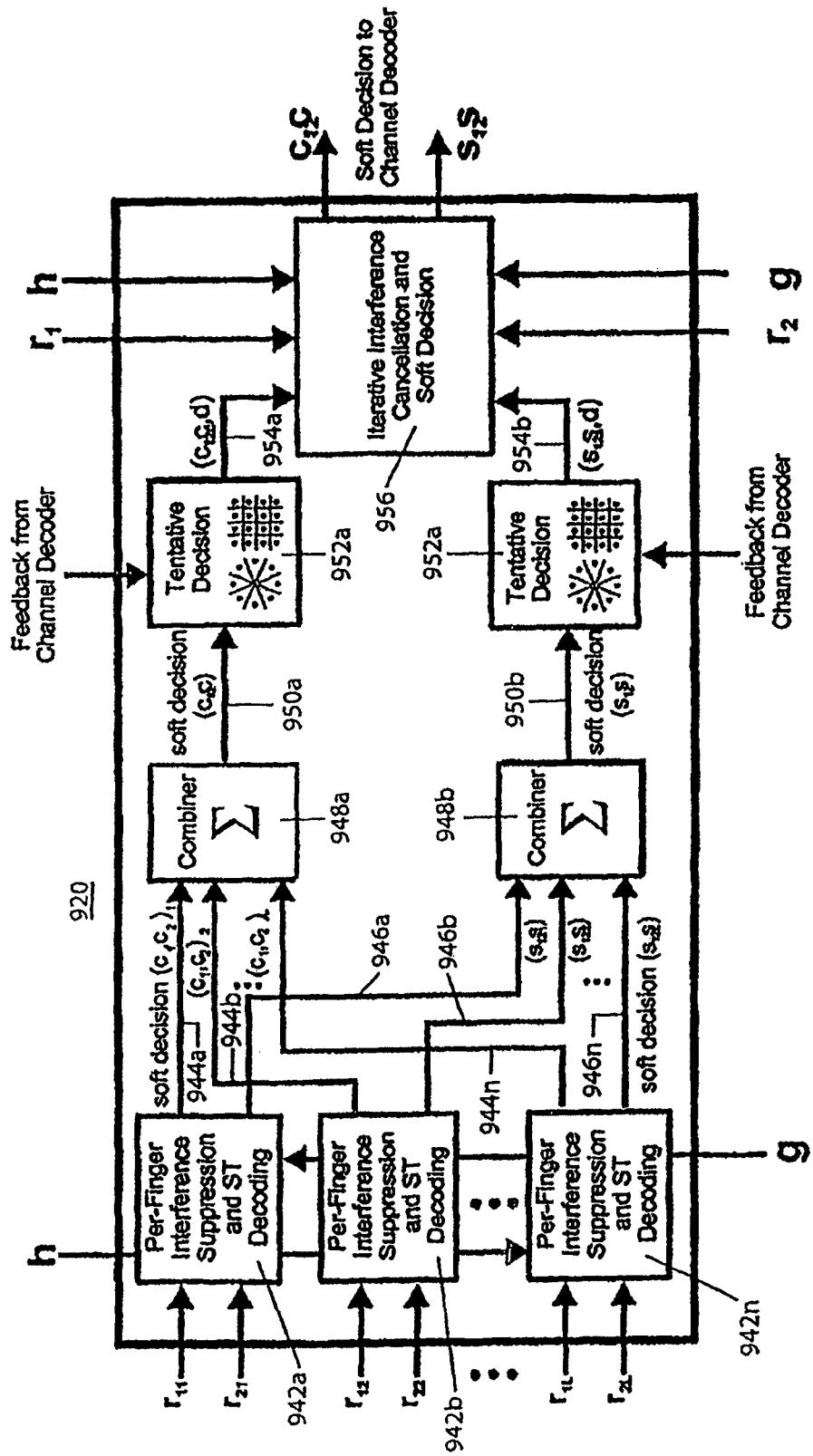
FIG. 9B is a block diagram of details of a first embodiment of the receiver of FIG. 9A.

Further details of one embodiment of subsystem 920 are shown in FIG. 9B. Subsystem 920 comprises a plurality of per finger interference suppression blocks 942a-942n, first and second combiners 948a, 948b, first and second tentative decision blocks 952a, 952b, and interference cancellation and soft decision block 956.

The signals at the output of multipliers 918a, 918b include multipath signals that have propagated along different paths from the transmitters to the receiver and consequently have arrived at slightly different times. The stronger of these signals are supplied to different fingers of subsystem 920. Illustratively, the multipath signals from the first multiplier 918a are identified by $r_{1x}$ and those from the second multiplier by $r_{2x}$. The second numeral in the subscript indicates the finger member. For each finger, one signal from the first multiplier and one signal from the second multiplier is supplied to a per finger interference suppression and space time decoder block 942. Channel information g about the channel from the second transmitter to the receiver and channel information h about the channel from the first transmitter to the receiver are supplied to all the per finger interference suppression and space time decoder blocks 942a-n.

Each per finger block make a preliminary decision as to the values of first and second pairs of symbols $(c_1, c_2)$ and $(s_1, s_2)$ in the received signals and supplies these decisions via lines 944a-n and 946a-n to combiners 948a and 948b, respectively. Combiners 948a and 948b combine the preliminary decisions from the per finger interference suppression and space time decoder blocks 942a-n and supply the results via lines 950a, 950b to tentative decision blocks 952a, 952b. Feedback from the channel decoder is also supplied to these blocks. The output of tentative decision blocks 952a, 952b is an estimate of the received signals $(c_1, c_2; s_1, s_2)$ and the reliability $(d_c, d_s)$ of the estimate. This information is supplied via lines 954a and 954b to iterative interference cancellation and soft decision block 956. Channel information h and g and received signals are also supplied to block 956. From this information, block 956 makes a soft decision as to the values of the first and second data streams in the received signals.

As will be apparent, the organization of subsystem 920 as shown in FIG. 9B is similar to that of block 418 shown in FIG. 4B and much of the processing performed in subsystem 920 is also similar.

The space-time block coder of FIG. 8 operates on successive symbols, illustratively on pairs of symbols. Thus coder 828a operates on the pair of symbols $(c_1, c_2)$, and coder 828b operates on the pair, $(s_1, s_2)$. For each pair of symbols provided to the input of space time coder 828a the coder generates the complex conjugate of each symbol and rearranges them so as to provide on one output the pair $(c_1, -c_2^*)$ and on the other output the pair $(c_2, c_1^*)$, where the lefthand symbol in each pair is the first in time on the output. Illustratively, the pair $(c_1, -c_2^*)$ is output on line 830a and transmitted from antenna 850a and the pair $(c_2, c_1^*)$ is output on line 830b and transmitted from antenna 851a. In like fashion, space time coder 828b receives pairs of symbols $(s_1, s_2)$ and provides on output lines 830b, 831b, the pairs of symbols $(s_1, -s_2^*)$ and $(s_2, s_1^*)$.

The received signals that are applied to each interference suppression block 942a-942n of FIG. 9B can be represented as $$r_{i,l} = \begin{bmatrix} r_1(k,l) \\ r_2^*(k+1,l) \end{bmatrix} = H_{il} \cdot c + G_{il} \cdot s + n_{il} \quad [26]$$

where I is the antenna number, k is time and l is the finger number and $$H_{il} = \begin{bmatrix} h_{i1}(l) & h_{i2}(l) \\ h_{i2}^*(l) & -h_{i1}^*(l) \end{bmatrix} \quad [27]$$

$$G_{il} = \begin{bmatrix} g_{i1}(l) & g_{i2}(l) \\ g_{i2}^*(l) & -g_{i1}^*(l) \end{bmatrix} \quad [28]$$

$$c = \begin{bmatrix} c(k) \\ c(k+1) \end{bmatrix} \quad [29]$$

$$s = \begin{bmatrix} s(k) \\ s(k+1) \end{bmatrix} \quad [30]$$

For two antenna the received signals may be represented by $$r_l = \begin{bmatrix} r_{1,l} \\ r_{2,l} \end{bmatrix} = \begin{bmatrix} H_{1l} & G_{1l} \\ H_{2l} & G_{2l} \end{bmatrix} \begin{bmatrix} c \\ s \end{bmatrix} + \begin{bmatrix} n_{1,l} \\ n_{2,l} \end{bmatrix} \quad [31]$$

which may be rewritten as $$r_{l,4\times 1} = [H'_{l4\times 2} \ G'_{l4\times 2}]_{4\times 4} \begin{bmatrix} c \\ s \end{bmatrix}_{4\times 1} + \eta_{l,4\times 1} \quad [32]$$

In addition, $$\begin{bmatrix} H_{1l} & G_{1l} \\ H_{2l} & G_{2l} \end{bmatrix} \equiv A'_l \quad [33]$$

It will be recognized that $H_{le}$ and $G_{le}$ are both orthogonal. Thus, $$H_{il}^* \cdot H_{il} = \delta_{h,il} \cdot I, \text{ where } \delta_{h,il} = |h_{i1}(l)|^2 + |h_{i2}(l)|^2 \quad [34]$$

$$G_{il}^* \cdot G_{il} = \delta_{h,il} \cdot I, \text{ where } \delta_{h,il} = |g_{i1}(l)|^2 + |g_{i2}(l)|^2 \quad [35]$$

$$H_{il}^* \cdot G_{il} \equiv B_{il} = \begin{bmatrix} b_{il,1} & b_{il,2} \\ b_{il,2}^* & -b_{il,1}^* \end{bmatrix} \quad [36]$$

It will be recognized that $B_{il}$ is also orthogonal.

Figure 10A:
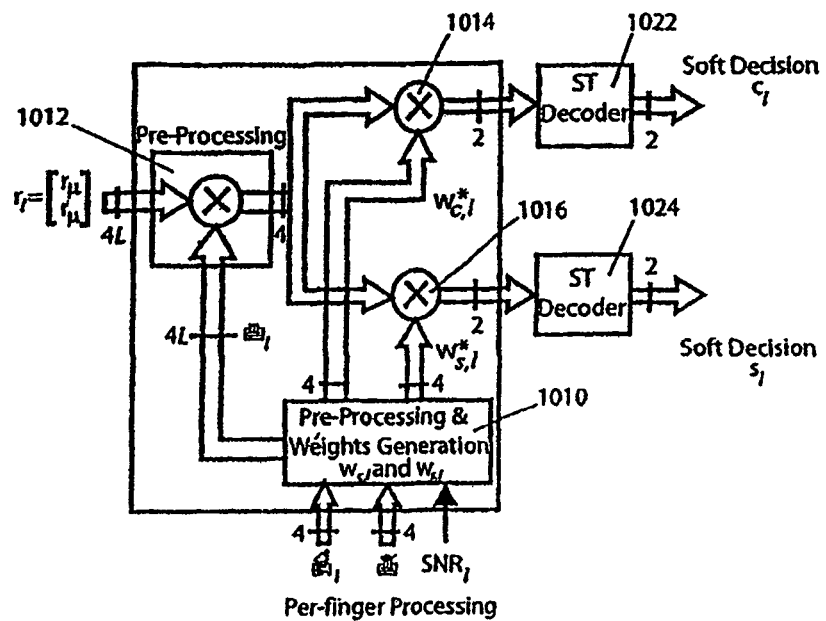
FIG. 10A is a block diagram of a further detail of the block diagram of FIG. 9B.

Illustrative apparatus for calculating estimates of the signal pairs $(c_1, c_2)$ and $(s_1, s_2)$ is shown in FIG. 10A. The apparatus comprises a pre-processing and weight generation block 1010, multipliers 1012, 1014 and 1016 and space-time decoders 1022, 1024. Inputs to the pre-processing and weight generation block 1010 include the channel information H and G and the signal to noise ratio.

At each finger, the received signal $r_l$ is multiplied at multiplier 1012 with the channel information represented by $A_l^*$ (see equation 33) to yield $$A_l^* r_l = \tilde{r} = \begin{bmatrix} \delta_{h,l} \cdot I & B_l \\ B_l^* & \delta_{gh,l} \cdot I \end{bmatrix}_{4\times 4} \begin{bmatrix} c \\ s \end{bmatrix} + \tilde{n}_l \quad [37]$$

where $$B_l^* B_l = (|b_{1l}|^2 + |b_{2l}|^2) \cdot I = \delta_{b,l} I \quad [38]$$

Sets of weights $w^*_{c,l}$ and $w^*_{s,l}$ are determined in pre-processing and weight generation block 1010 such that $$W_{c,l} = [I - \delta_{g,l}^{-1} \cdot B_l]_{2\times 4} \quad [39]$$

$$W_{s,l} = [I - \delta_{h,l}^{-1} \cdot B_l]_{2\times 4} \quad [40]$$

The weights are then multiplied in multipliers 1014 and 1016 with the output $\tilde{n}_l$ from multiplier 1012 and decoded by space time decoders 1022, 1024 to produce estimates of the signal pair $(c_1, c_2)$ and $(s_1, s_2)$. This processing is represented by $$W_{c,l}^* \cdot \tilde{r}_l = r_{c,l} = \tilde{\delta}_{h,l} \cdot c + \tilde{n}_{c,l} \quad [41]$$

$$W_{s,l}^* \cdot \tilde{r}_l = r_{s,l} = \tilde{\delta}_{g,l} \cdot s + \tilde{n}_{s,l} \quad [42]$$

Since $\tilde{n}_{c,l}$ and $\tilde{n}_{s,l}$ are uncorrelated, white noise, the estimates of c and s are good soft decisions. These estimates are supplied by each finger to combiner 948a and 948b where the estimates are combined and supplied to first and second tentative decision blocks 952a and 952b.

Tentative decision blocks 952a and 952b operate in essentially the same fashion as tentative decision blocks 472a and 472b to generate an estimate of the received signal and its reliability, in this case operating on pairs of signals. A tentative decision as to the value of c and s is made using a mean square error computation to locate the minimum distance between the received signal and a point in the signal constellation. This computation is represented mathematically by $$\hat{c}_{tsd} = \underset{c_c \in C_c}{\operatorname{argmin}} \sum_{l=1}^{L} \|r_{c,l} - \tilde{\delta}_{h,l} \cdot c_c\|^2 \quad [43]$$

$$\hat{s}_{tsd} = \underset{s_c \in S_c}{\operatorname{argmin}} \sum_{l=1}^{L} \|r_{s,l} - \tilde{\delta}_{g,l} \cdot s_c\|^2$$

In addition, the reliabilities $d_c$ and $d_s$ of the estimates of c and s are also computed according to the formulas $$d_{\hat{c}} = \sum_{l=1}^{L} \|r_{c,l} - \tilde{\delta}_{h,l} \cdot \hat{c}\|^2 \quad [44]$$

$$d_{\hat{s}} = \sum_{l=1}^{L} \|r_{s,l} - \tilde{\delta}_{g,l} \cdot \hat{s}\|^2$$

The output of tentative decision block 952a is an estimate of the received signal pair $(c_1, c_2)$ and the reliability of this estimate, $d_c$; and the output of tentative decision block 952b is an estimate of the received signal pair $(s_1, s_2)$ and the reliability of this estimate, $d_s$. This information is supplied to interference suppression and soft decision block 956.

The operation of interference suppression and soft decision block 956 is essentially the same as that of interference suppression and soft decision block 476. This block performs the same operation on the signals received from tentative decision blocks 952a and 952b, compares the results and picks the better one. This block comprises first and second multipliers 1208a, 1208b, first and second adders 1210a, 1210b, first and second soft decision blocks 1212a, 1212b, third and fourth adders 1214a, 1214b and reliability decision block 1220. The operation of this block is the same as that depicted in FIG. 7 but the block is operating on signal pairs and not individual signals.

The output of the block is a decision as to the value of signal pairs ($c_1$, $c_2$) and ($s_1$, $s_2$) which is provided to the channel decoders 930a, 930b.

Figure 9C:
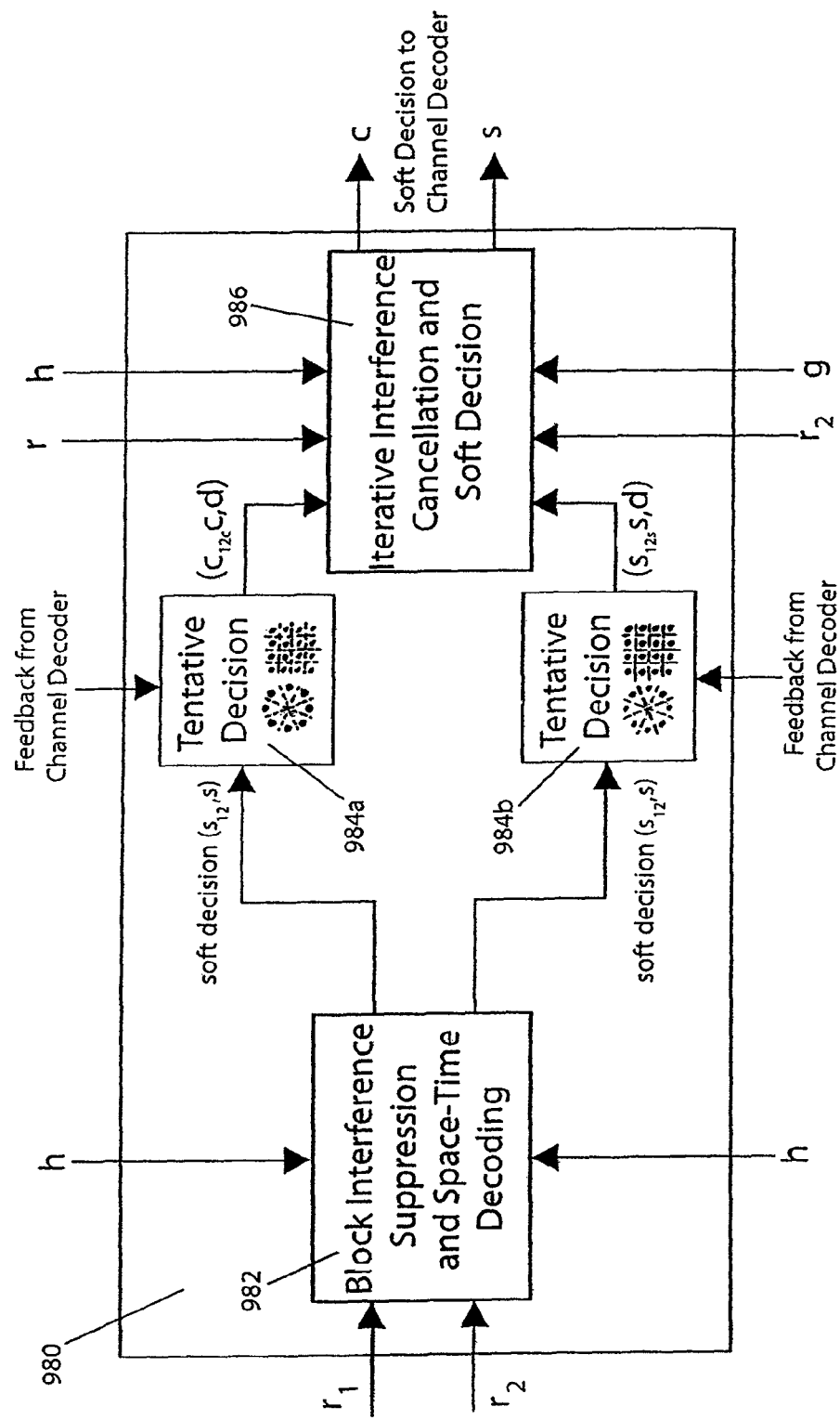
FIG. 9C is a block diagram of details of a second embodiment of the receiver of FIG. 9A.

As in the case of the receiver of FIG. 4A, interference suppression can also be performed on a block basis. A receiver 980 for doing so is depicted in FIG. 9C. Receiver 980 comprises a block interference suppression and space time decoding subsystem 982, first and second tentative decision blocks 984a, 984b, and interference cancellation and soft decision block 986. The inputs to receiver 980 and the outputs therefrom are the same as those of receiver 900 of FIG. 9B.

Figure 10B:
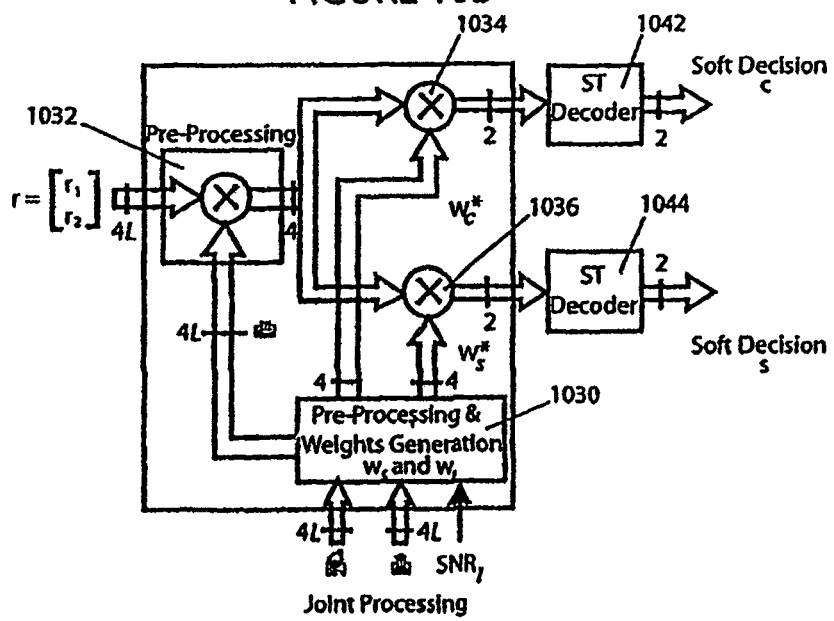
FIG. 10B is a block diagram of a further detail of the block diagram of FIG. 9C.

Details of the block interference suppression and combining subsystem 982 are set forth in FIG. 10B. The subsystem comprises a weight pre-processing and generation block 1030, multipliers 1032, 1034 and 1036 and space-time decoders 1042, 1044 and 534. This subsystem is similar to the interference suppression block of FIG. 10 but the number of data signal inputs, and g and h channel gain inputs in each case is 4L where L is the number of fingers. In contrast, each interference suppression block of FIG. 10A has 4 data signal inputs and 4 inputs each for the G and H channel information.

Similarly, the mathematical representation of the processing performed in subsystem 982 is similar to that of block 942 but the matrices are much larger.

The signal model for the received signals at all the fingers is represented by $$r_{4L \times 1} = \begin{bmatrix} r_1 \\ r_2 \\ \cdots \\ r_L \end{bmatrix} \begin{bmatrix} H'_1 & G'_1 \\ H'_2 & G'_2 \\ \cdots & \cdots \\ H'_L & G'_L \end{bmatrix}_{4L \times 4} \begin{bmatrix} c \\ s \end{bmatrix}_{4 \times 1} + \begin{bmatrix} \eta_1 \\ \eta_2 \\ \cdots \\ \eta_L \end{bmatrix}_{4L \times 1} \quad [45]$$

or more simply $$r = [H' \; G'] \begin{bmatrix} c \\ s \end{bmatrix} + \eta \quad [46]$$

where $$[H' \, A'] = A' \quad [47]$$

The columns of H are orthogonal and the columns of G are orthogonal. In addition, $$H'^{*}_l \cdot H'_l = \sum_{i=1}^{2} H^{*}_{il} \cdot H_{il} = \left( \sum_{i=1}^{2} \delta_{h,il} \right) \cdot I = \delta_{h,il} \cdot I \quad [48]$$

$$G'^{*}_l \cdot G'_l = \sum_{i=1}^{2} G^{*}_{il} \cdot G_{il} = \left( \sum_{i=1}^{2} \delta_{g,il} \right) \cdot I = \delta_{g,il} \cdot I \quad [49]$$

$$H'^{*}_l \cdot G'_l = \sum_{i=1}^{2} H^{*}_{il} \cdot G_{il} = \sum_{i=1}^{2} B_{il} \triangleq B_l = \begin{bmatrix} b_{l,1} & b_{l,2} \\ b^{*}_{l,2} & -b^{*}_{l,1} \end{bmatrix} \quad [50]$$

The pre-processing operation of the pre-processing and weight generation block 1020 produces the values $$A^{*}r = \tilde{r} = \begin{bmatrix} \delta_h \cdot I & B \\ B^{*} & \delta_g \cdot I \end{bmatrix}_{4 \times 4} \begin{bmatrix} c \\ s \end{bmatrix} + \tilde{\eta} \quad [51]$$

$$B_{2 \times 2} = \sum H'^{*}_l G'_l = \begin{bmatrix} b_1 & b_2 \\ b^{*}_2 & -b^{*}_1 \end{bmatrix} \quad [52]$$

$$\delta_h = \sum \delta_{h,l} \quad [53]$$

$$\delta_g = \sum \delta_{g,l}$$

$$B^{*}_l B_l = (|b_1|^2 + |b_2|^2) \cdot I = \delta_b \cdot I \quad [54]$$

And the weight generation function produces the weights:

$$W_c = [I - \delta_g^{-1} \cdot B]_{2 \times 4} \quad [55]$$

$$W_s = [I - \delta_h^{-1} \cdot B]_{2 \times 4} \quad [56]$$

The value A is supplied to multiplier 1030 where it is multiplied with the received signal to produce $\tilde{r}$ to produce the value $$r_{c,l} = W_c^{*} \cdot \tilde{r} \quad [57]$$

and the weight $W_s^{*}$ is supplied to multiplier 1034 where it is multiplied by $\tilde{r}$ to produce the value $$r_s = W_s^{*} \cdot \tilde{r} \quad [58]$$

The output of multiplier 1032 is supplied to ST decoder 1040 where an estimate of the signal pair ($c_1$, $c_2$) is formed using the relation $$r_c = \tilde{\delta}_h \cdot c + \tilde{n}_c \quad [59]$$

and the output of multiplier 1034 is supplied to ST decoder 1042 where an estimate of the signal pair ($s_1$, $s_2$) is formed using the relation $$r_s = \tilde{\delta}_g \cdot s + \tilde{n}_s \quad [60]$$

where $$\tilde{\delta}_h = \frac{\delta_h \cdot \delta_g - \delta_b}{\delta_g} \quad [61]$$

$$\tilde{\delta}_g = \frac{\delta_g \cdot \delta_g - \delta_b}{\delta_g} \quad [62]$$

Figure 11A:
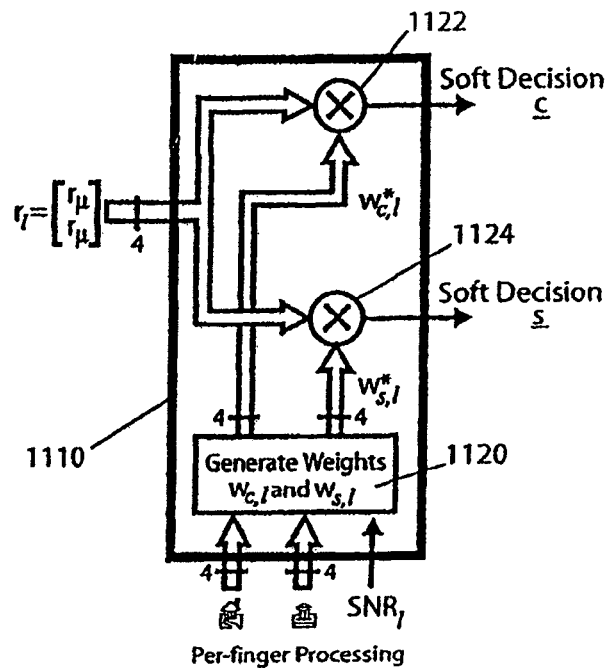
FIGS. 11A and 11B are block diagrams of alternatives to FIGS. 10 and 10B.
Figure 11B:
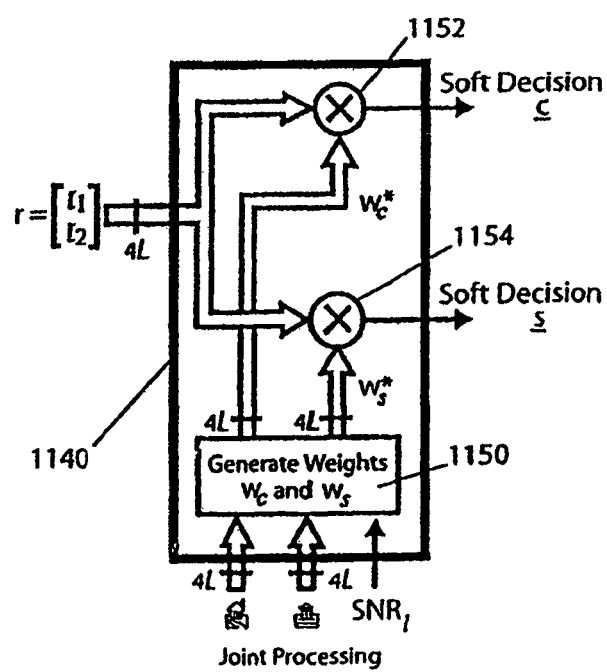
Figure 12:
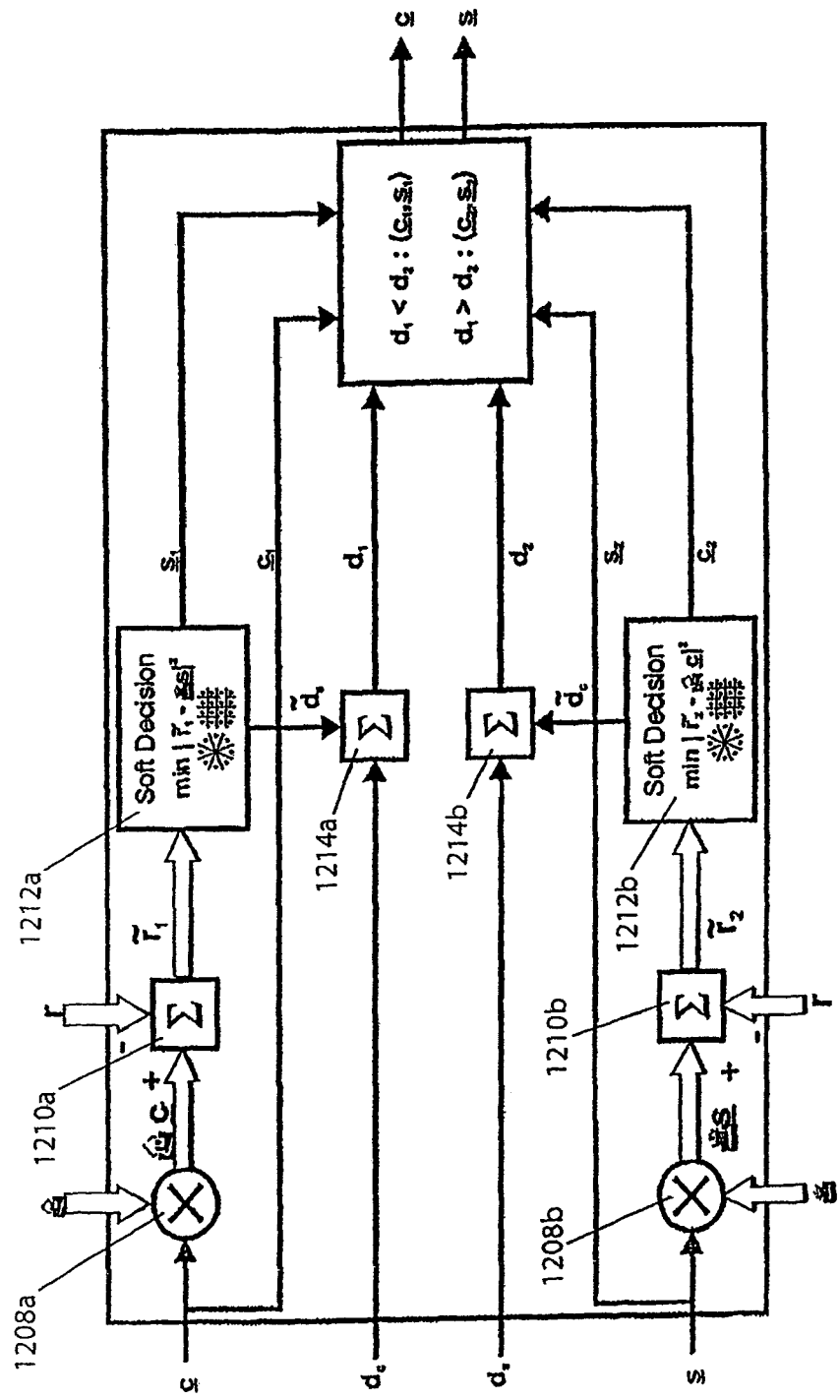
FIG. 12 is a block diagram of another detail of the receiver of FIG. 9A.

Alternative devices for the interference suppression and space time decoding blocks of FIGS. 10A and 10B are shown in FIGS. 11A and 11B. Apparatus 1110 of FIG. 11A comprises a weight generation block 1120 and first and second multipliers 1122 and 1124. Apparatus 1140 of FIG. 11B comprises a weight generation block 1150 and first and second multipliers 1152 and 1154. While similar in overall configuration, the two devices have very different numbers of inputs. Apparatus 1110 receives 4 input signals r, 4 signals each for the channel information H and G and the signal to noise ration. Apparatus 1140 receives 4L input signals, 4L signals each for H and G and the signal to noise ration. One apparatus 1110 is used in the receiver of FIG. 9B for each finger while only one apparatus 1140 is used in the receiver of FIG. 9C.

In apparatus 1110, the correlation matrix R can be determined from the channel information and the signal to noise ratio by $$R_{l4\times 4} = A_1 A_1 * + \frac{1}{\Gamma_1} \cdot I \qquad [63]$$

To obtain estimates of the signal pairs $c=c_1, c_2$ and $s=s_1, s_2$ for each finger, we need to find a set of weights $$W_{c,l4\times 2} = R_l^{-1} \cdot H_l \qquad [64]$$

$$W_{s,l4\times 2} = R_l^{-1} \cdot G_l$$

such that $$W^*_{c,l} \cdot r_l = c + \tilde{n}_{c,l} \qquad [65]$$

$$W^*_{c,l} \cdot r_l = c + \tilde{n}_{c,l} \qquad [65]$$

As indicated, the weights are obtained by determining the correlation matrix, inverting it and multiplying it by the channel information H or G.

The estimates are obtained by multiplying the weights at multipliers 1122 and 1124 with the received signals. Thereafter, the estimates are combined at combiners 948a and 948b of the receiver of FIG. 9B and forwarded to tentative decision blocks 952a, 952b where an estimate of the received signals is made by a minimum mean square error computation.

Apparatus 1140 processes the signals in the same fashion but uses much larger matrices encompassing all the signals supplied to the interference suppression and space time decoding block. In particular, the correction matrix R has the size 4L×4L where L is the number of fingers and the weighting matrices have the size 4L×2.

As will be apparent to those skilled in the art, numerous modifications may be made to the above invention with the spirit and scope of the invention.

What is claimed:

1. A method for receiving data signals transmitted by multiple transmitters, each data signal having a data stream that is independent of the data stream of the other data signals, comprising:
   receiving a first data signal at a first antenna and a second data signal at a second antenna;
   filtering the first and second received data signals;
   suppressing signal interference in each of the filtered first and second data signals, wherein the suppressing step comprises:
     making a preliminary decision on the value of the data stream of each of the filtered first and second data signals;
     combining the preliminary decisions; calculating an estimate for each of the filtered first and second data signals;
     calculating the reliability of each estimate; and
     making a soft decision as to the value of the data streams of each of the filtered first and second data signals;
   decoding each signal interference suppressed signal; and
   assembling the decoded signals into a first decoded data stream and a second decoded data stream, which is parallel to the first decoded data stream.

2. The method of claim 1, further comprising detecting data symbols of the data streams in the filtered first and second data signals.

3. The method of claim 1, wherein the step of making a preliminary decision uses channel information about the channel from a transmitter to a receiver.

4. The method of claim 1, wherein the estimating step uses channel decoder information.

5. A method for receiving data signals transmitted by multiple transmitters, each data signal having a data stream that is independent of the data stream of the other data signals, comprising:
   receiving a first data signal at a first antenna and a second data signal at a second antenna;
   filtering the first and second received data signals;
   suppressing signal interference in each of the first and second filtered data signals, wherein the suppressing step comprises:
     calculating a first estimate of the first filtered data signal and a second estimate of the second filtered data signal;
     calculating the reliability of each estimate;
     multiplying each estimate by channel information about the channel from its transmitter to a receiver;
     determining the difference between the first data signal and the contribution to the first data signal arising from the first estimate and the channel information;
     determining the difference between the second data signal and the contribution to the second data signal arising from the second estimate and the channel information;
     creating a new estimate for each of the first and second filtered data signals;
     calculating the reliability for each new estimate;
     summing the reliability of the first new estimate with the reliability of the first estimate and summing the reliability of the second new estimate with the reliability of the second estimate; and
     comparing the results of the summing step and outputting one of the new estimates based on said comparing step;
   decoding each signal interference suppressed signal; and
   assembling the decoded signals into a first decoded data stream and a second decoded data stream, which is parallel to the first decoded data stream.

6. The method of claim 5, wherein said creating step uses a minimum mean square error determination.

7. A method for iterative interference suppression comprising:
   receiving first and second signals;
   calculating a first estimate of the first signal and a second estimate of the second signal;
   calculating the reliability of each estimate;
   multiplying each estimate by channel information;
   determining the difference between the first signal and the contribution to the first signal arising from the first estimate and the channel information;
   determining the difference between the second signal and the contribution to the second signal arising from the second estimate and the channel information;
   creating a new estimate for each of the first and second signals;
   calculating the reliability for each new estimate;
   summing the reliability of the first new estimate with the reliability of the first estimate and summing the reliability of the second new estimate with the reliability of the second estimate; and
   comparing the results of the summing steps and outputting one of the new estimates based on the comparison result.

8. The method of claim 7, wherein said creating step uses a minimum mean square error determination.

9. A receiver for receiving data signals transmitted by multiple transmitters, each data signal having a data stream that is independent of the data streams of the other data signals, comprising:

a first and second antenna configured to receive respective first and second transmitted data signals;

a first filter configured to filter the first signal and a second filter configured to filter the second signal;

a signal processor configured to suppress signal interference in the filtered first and second signals, wherein the signal processor comprises:

an interference suppression unit configured to perform interference suppression on each of the filtered first and second signals;

a first tentative decision unit configured to generate an estimate of the first signal output by the interference suppression unit, and a second tentative decision unit configured to generate an estimate of the second signal output by the interference suppression unit; and a soft decision unit configured to make a soft decision as to values of the data streams in the first and second signals output by the first and second tentative decision units;

first and second channel decoders coupled to the signal processor and configured to decode the filtered first and second signals, respectively; and a combiner configured to combine the outputs of the first and second channel decoders into a single data stream.

10. The receiver of claim 9, wherein the first and second filters are configured to provide matched filtering.

11. The receiver of claim 9, wherein the signal processor is configured to detect data symbols of the data streams in the filtered first and second signals.

12. The receiver of claim 9, further comprising a first feedback path from the first channel decoder to the signal processor and a second feedback path from the second channel decoder to the signal processor.

13. The receiver of claim 9, wherein the first and second transmitted data signals are multipath signals and do not arrive at the receiver at the same time.

14. The receiver of claim 9, further comprising a channel information supplier configured to supply channel information to the interference suppression unit.

15. The receiver of claim 9, further comprising a channel decoder information supplier configured to supply channel decoder information to the first and second tentative decision units.

16. The receiver of claim 9, wherein the soft decision is based on a comparison of the estimates of the first and second signals generated from the respective first and second tentative decision units.

17. The receiver of claim 9, wherein the interference suppression unit comprises:

a plurality of interference suppression units configured to receive respective signals from the first and second multipliers and make respective preliminary decisions as to values of the data streams of each of the first and second filtered signals; and first and second combiners configured to combine the preliminary decisions from the plurality of interference suppression units.

18. The receiver of claim 9, wherein the first and second transmitted data signals comprise direct and multipath reflected independent data stream signals modulated using different signal constellations.

19. A receiver for receiving data signals transmitted by multiple transmitters, each data signal having a data stream that is independent of the data streams of the other data signals, comprising:

a first and second antenna configured to receive respective first and second transmitted data signals;

a first filter configured to filter the first signal and a second filter configured to filter the second signal;

a signal processor configured to suppress signal interference in the first and second filtered signals, wherein the signal processor comprises:

a plurality of interference suppression units configured to receive respective signals from the first and second multipliers and make preliminary decisions as to values of the data streams of each of the first and second filtered signals;

first and second combiners configured to combine the preliminary decisions from the plurality of interference suppression units;

a first tentative decision unit configured to generate an estimate of the first signal output by the first combiner, and a second tentative decision block configured to generate an estimate of the second signal output by the second combiner; and an interference cancellation and soft decision unit configured to make soft decisions as to values of the data streams in the first and second signals output by the first and second tentative decision units;

first and second channel decoders coupled to the signal processor and configured to decode the first and second filtered signals, respectively; and a combiner configured to combine the outputs of the first and second channel decoders into a single data stream.

20. The receiver of claim 19, wherein the first and second tentative decision units are configured to calculate the reliabilities of their respective estimates.

* * * * *

UNITED STATES PATENT AND TRADEMARK OFFICE
CERTIFICATE OF CORRECTION

PATENT NO. : 8,724,749 B2  
APPLICATION NO. : 12/605837  
DATED : May 13, 2014  
INVENTOR(S) : Ayman F. Naguib Page 1 of 1

It is certified that error appears in the above-identified patent and that said Letters Patent is hereby corrected as shown below:

On the Title Page

Item (73) ASSIGNEE, please delete "Intel Mobil Communications GmbH Neubiberg (DE)" and insert -- Intel Mobile Communications GmbH Neubiberg (DE) --, therefor.

Signed and Sealed this  
Sixteenth Day of June, 2015

Michelle K. Lee  
*Director of the United States Patent and Trademark Office*